United States Patent
Miyano et al.

(10) Patent No.: US 11,380,103 B2
(45) Date of Patent: Jul. 5, 2022

(54) COVERAGE DEVICE, MOVING BODY, CONTROL DEVICE, AND MOVING BODY DISTRIBUTED CONTROL PROGRAM

(71) Applicant: KABUSHIKI KAISHA TOYOTA CHUO KENKYUSHO, Nagakute (JP)

(72) Inventors: Tatsuya Miyano, Nagakute (JP); Kazuki Shibata, Nagakute (JP); Tomohiko Jimbo, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 148 days.

(21) Appl. No.: 16/627,044

(22) PCT Filed: Jun. 28, 2018

(86) PCT No.: PCT/JP2018/024655
§ 371 (c)(1),
(2) Date: Dec. 27, 2019

(87) PCT Pub. No.: WO2019/013011
PCT Pub. Date: Jan. 17, 2019

(65) Prior Publication Data
US 2020/0125856 A1    Apr. 23, 2020

(30) Foreign Application Priority Data
Jul. 10, 2017  (JP) .............................. JP2017-135071

(51) Int. Cl.
*G06V 20/52* (2022.01)
*G06V 10/25* (2022.01)
(Continued)

(52) U.S. Cl.
CPC .............. *G06V 20/52* (2022.01); *G06V 10/25* (2022.01); *G06V 20/13* (2022.01); *B64C 39/024* (2013.01); *B64C 2201/127* (2013.01); *G06N 5/02* (2013.01)

(58) Field of Classification Search
CPC ............. G06K 9/00771; G06K 9/0063; G06K 9/3233; G06K 9/00637; B64C 39/024;
(Continued)

(56) References Cited

U.S. PATENT DOCUMENTS

2011/0231016 A1* 9/2011 Goulding ............... G01C 21/20
                                                               700/246

FOREIGN PATENT DOCUMENTS

CN       106705970 B  *  7/2020  ............. G01C 21/20
JP       2016-118996 A     6/2016

OTHER PUBLICATIONS

Khan, A., Rinner, B. and Cavallaro, A., 2016. Cooperative robots to observe moving targets. IEEE transactions on cybernetics, 48(1), pp. 187-198.*

(Continued)

*Primary Examiner* — Zhitong Chen
(74) *Attorney, Agent, or Firm* — Oliff PLC

(57) ABSTRACT

A surveillance performance (information expressing uncertainty of information relating to a potential risk area in a region that requires monitoring) and a tracking performance (information expressing the product of an importance level of a potential risk area and a coverage ratio (an overlap rate between potential risk areas and moving bodies)) are mutually analyzed, and plural moving bodies are allotted to either surveillance or tracking. Potential risk areas that require monitoring are determined such that the surveillance performance and the tracking performance respectively satisfy predetermined levels. The plural moving bodies are allo- (Continued)

cated to potential risk areas determined to be potential risk areas that require monitoring (simultaneous optimization). The respective moving bodies subject to simultaneous optimization start moving toward their allocated potential risk areas to monitor the potential risk areas.

22 Claims, 34 Drawing Sheets

(51) Int. Cl.
*G06V 20/13* (2022.01)
*B64C 39/02* (2006.01)
*G06N 5/02* (2006.01)

(58) Field of Classification Search
CPC .... B64C 2201/127; G06N 5/02; G06N 5/046; H04N 7/18; G05D 1/00
See application file for complete search history.

(56) References Cited

OTHER PUBLICATIONS

Sep. 18, 2018 International Search Report issued in International Patent Application No. PCT/JP2018/024655.

\* cited by examiner

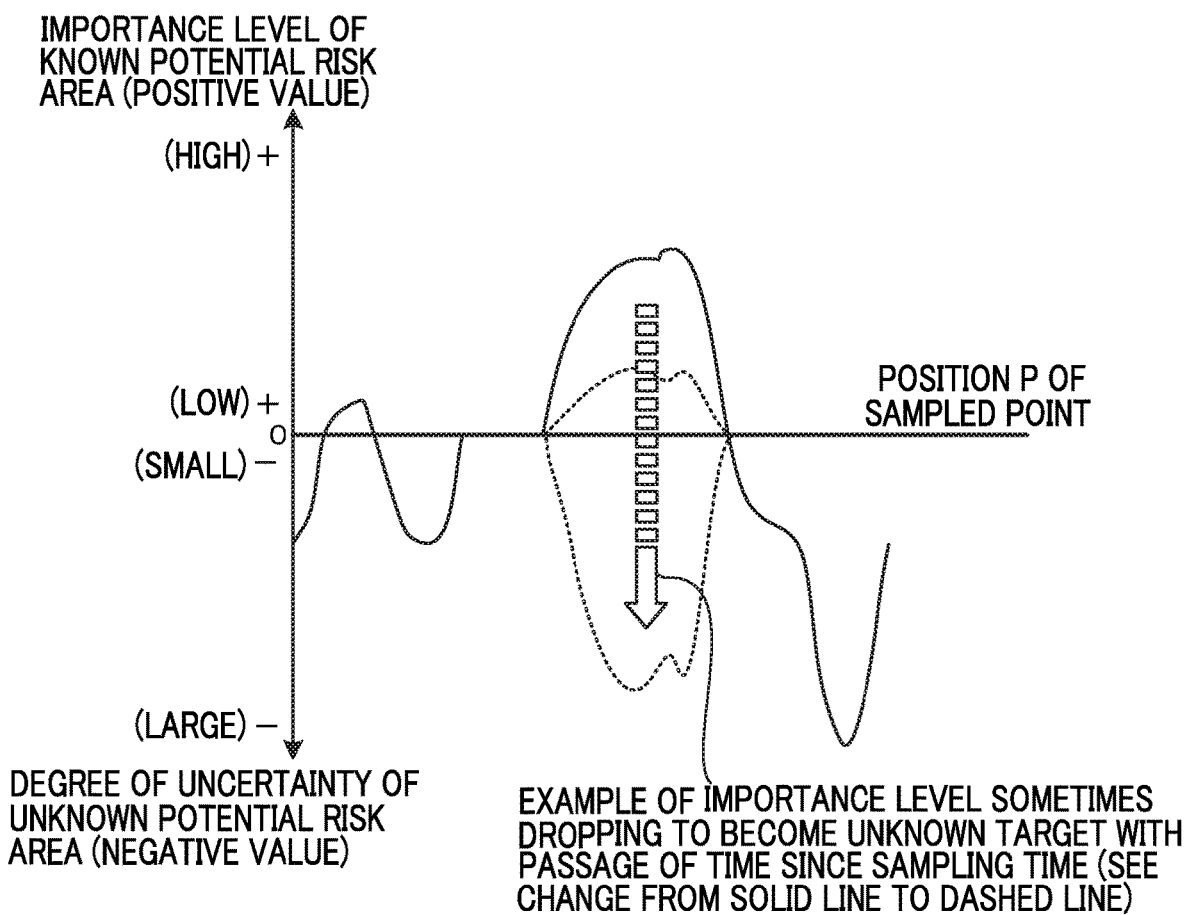

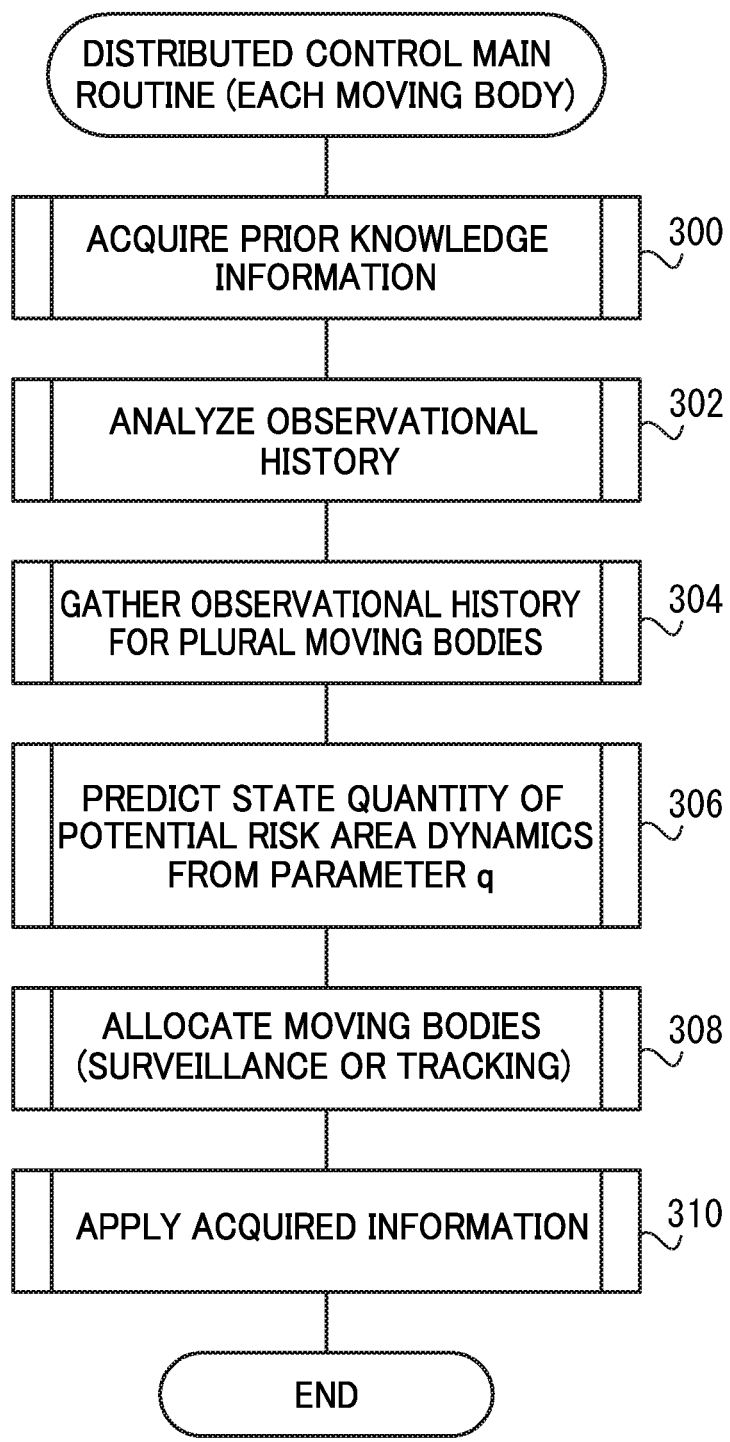

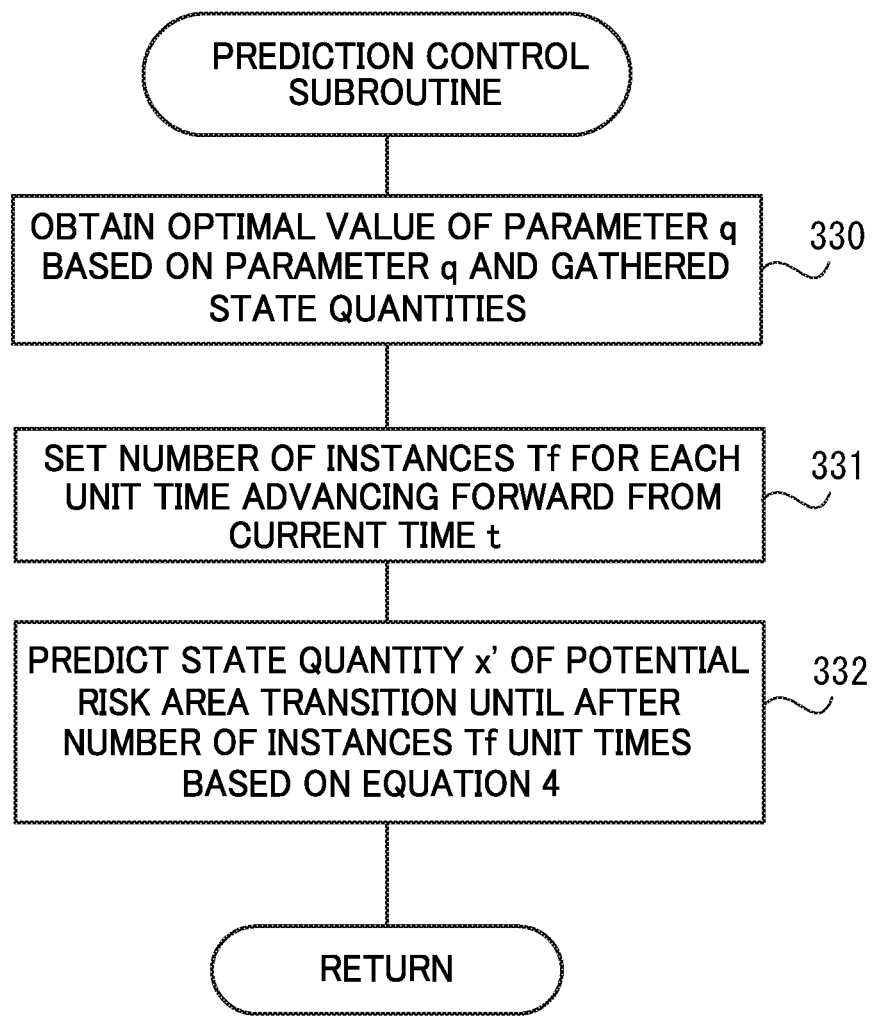

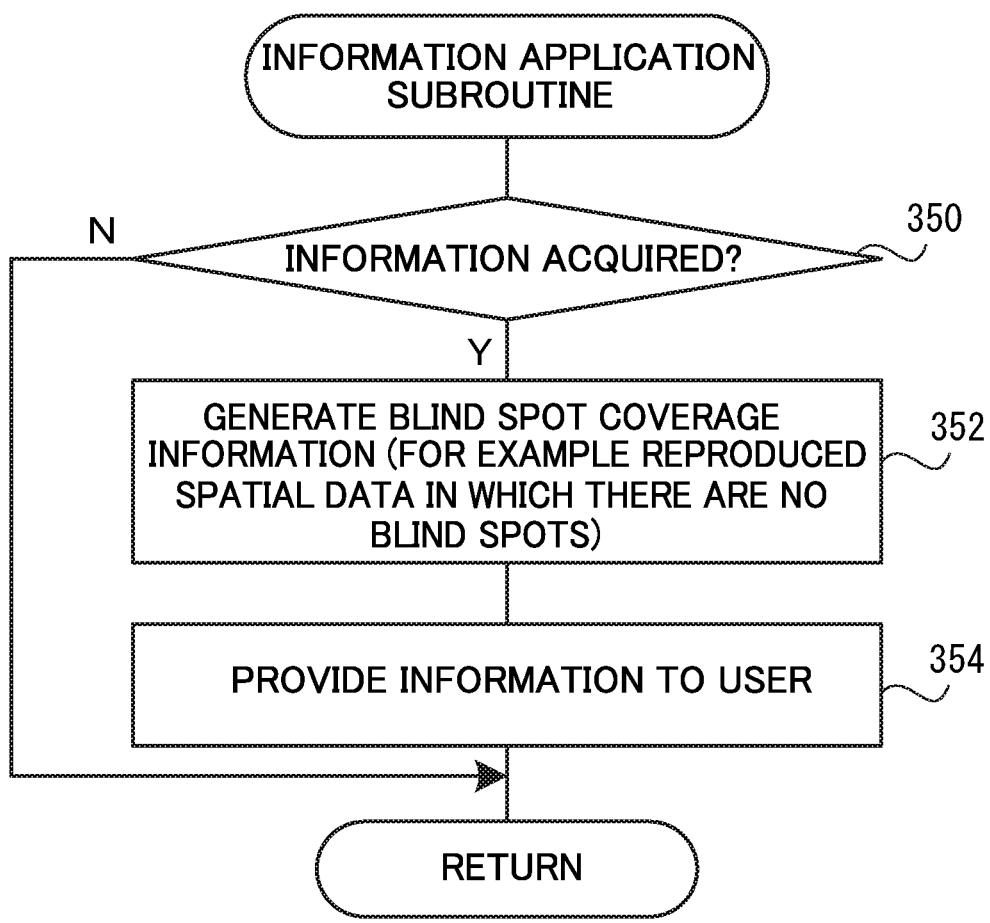

FIG.12A
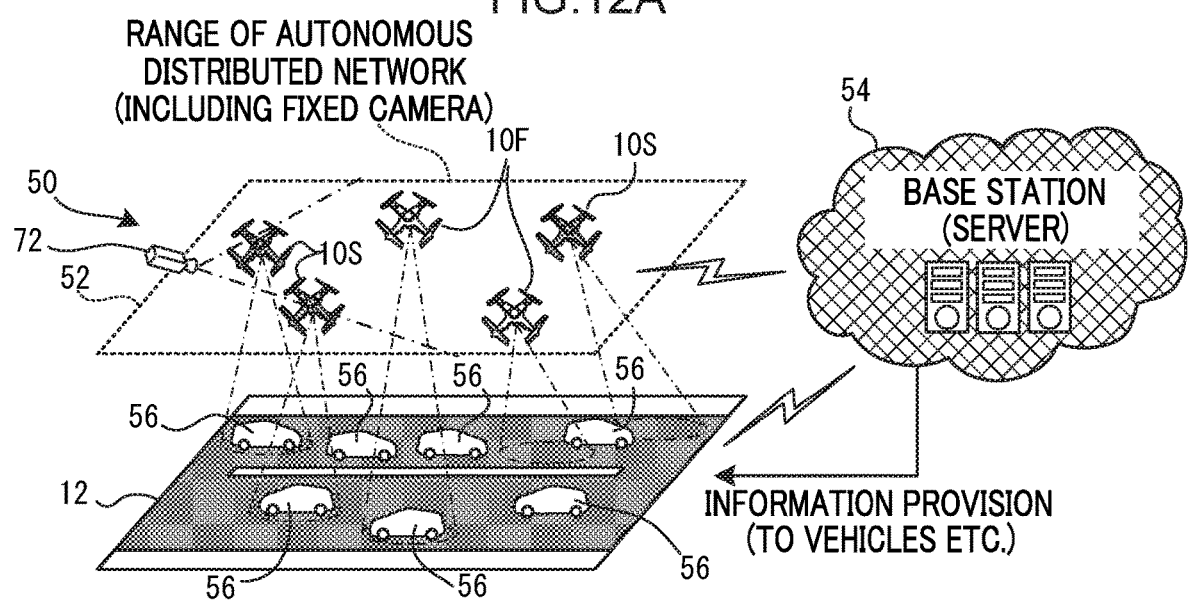
 : SURVEILLANCE TEAM (ESTIMATE, UPDATE IMPORTANCE LEVELS)
 : TRACKING TEAM (ACQUIRE IMPORTANCE LEVEL INFORMATION)

FIG.13
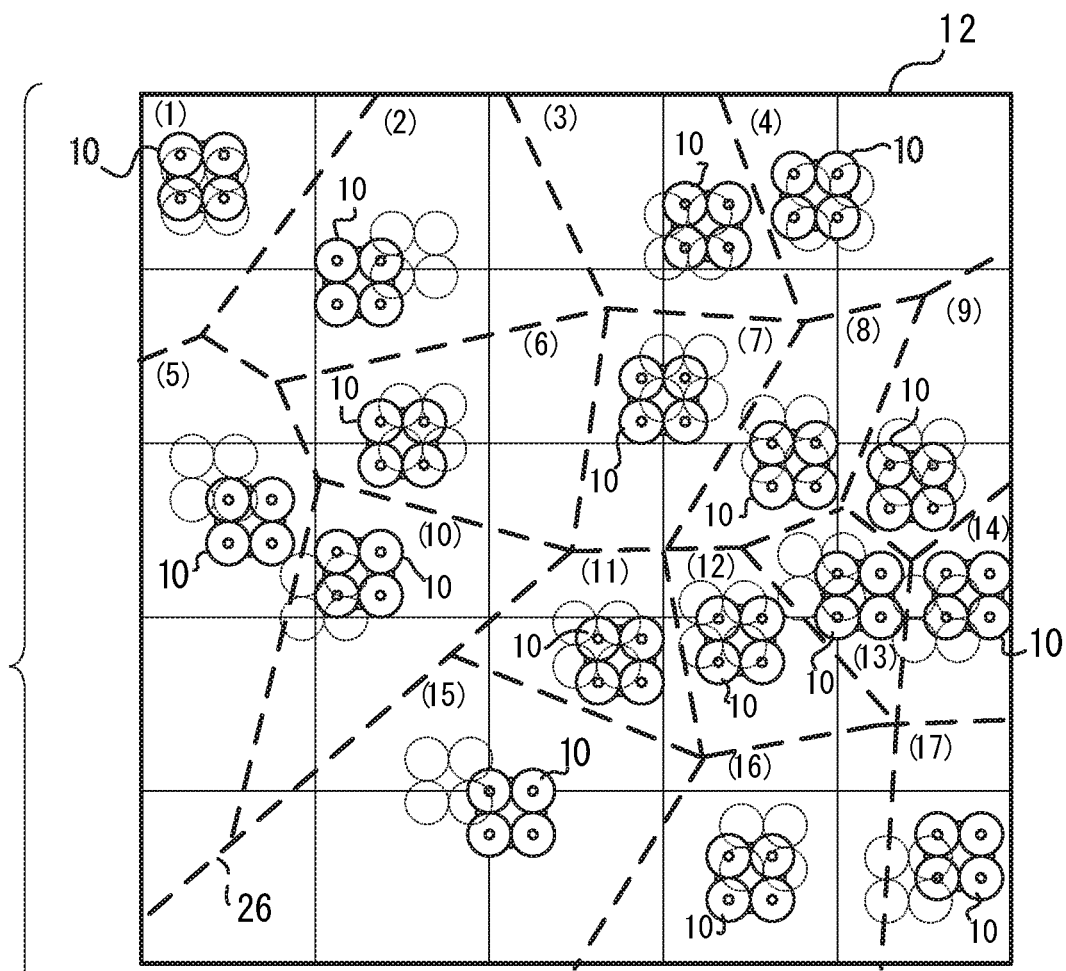
NOTES:
AFTER MOVING (CURRENT POSITION) 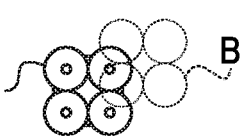 BEFORE MOVING
— — — — VORONOI REGION BOUNDARY LINE

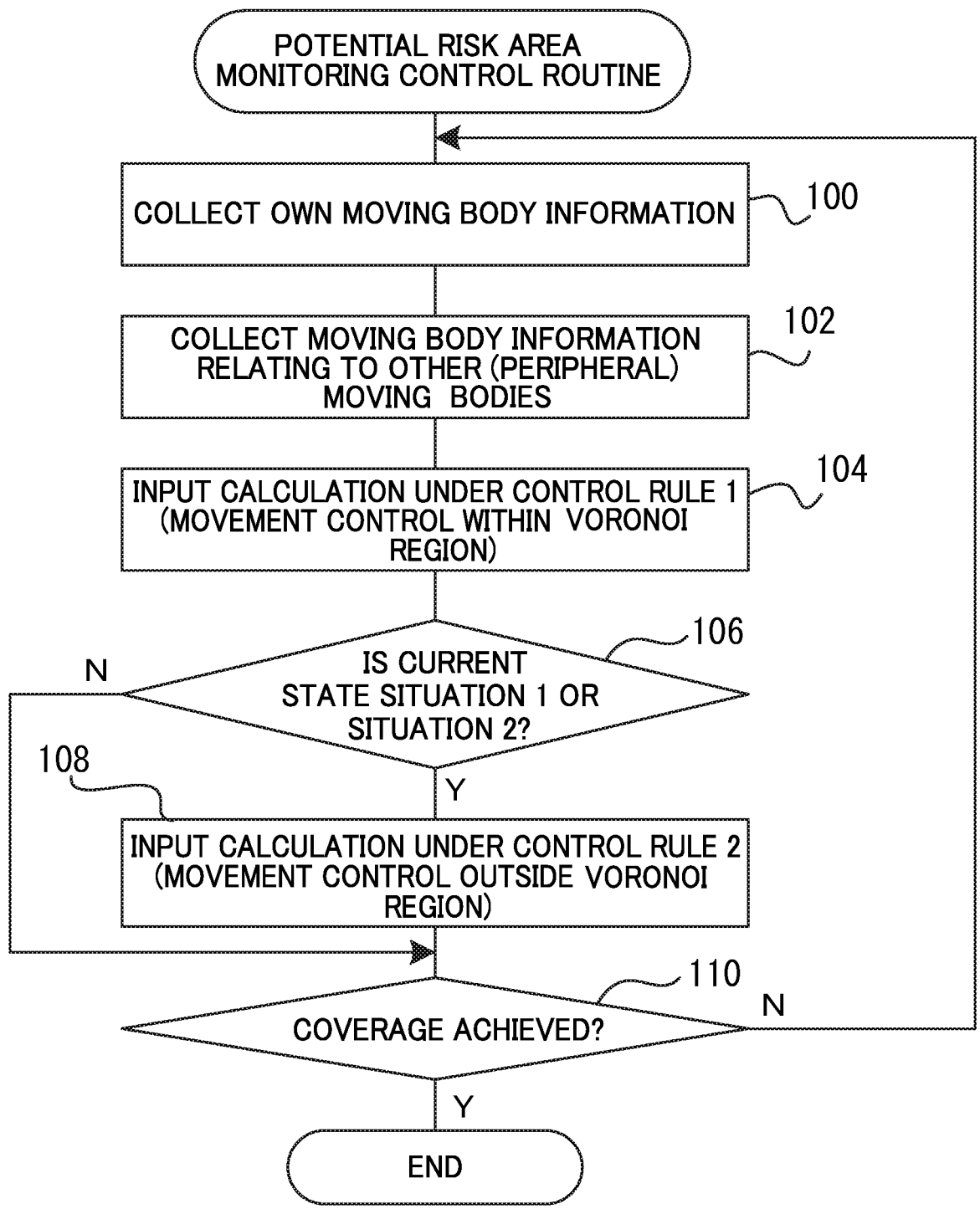

VORONOI REGION BOUNDARY LINES
IMMEDIATELY BEFORE MOVEMENT
CONTROL UNDER CONTROL RULE 2

COVERAGE DEVICE, MOVING BODY, CONTROL DEVICE, AND MOVING BODY DISTRIBUTED CONTROL PROGRAM

TECHNICAL FIELD

The present disclosure relates to a coverage device that uses a sensor to provide coverage of a target region, a moving body, a control device configured to control movement to bring a designated monitoring target into a monitoring range, and a moving body distributed control program.

BACKGROUND ART

Japanese Patent Application Laid-Open (JP-A) No. 2016-118996 discloses a monitoring system in which a flying device is controlled so as to move to an appropriate position to monitor a monitoring target.

To explain this in more detail, the monitoring system includes at least a flying device that monitors the ground from the air, and a sensor device. The sensor device includes a storage unit that stores an elevation angle for a monitoring target for each control type, a target calculating unit that, with reference to the storage unit, calculates a target position equivalent to an elevation angle corresponding to the control type when a control signal including the control type is input; and a flying device controlling unit for moving the flying device to the target position. Note that JP-A No. 2016-118996 does not employ logic that envisages plural moving bodies (flying devices). Moreover, it is assumed that the monitoring target has been identified in advance.

By way of reference, distributed management technology in which Voronoi regions are defined exists as technology for controlling plural moving bodies without resorting to centralized management.

For example, plural camera-equipped moving bodies are moved to potential risk areas (monitoring targets) set within a predetermined region. To monitor the potential risk areas, the predetermined region is partitioned into Voronoi regions, and each of the partitioned regions is set so as to be under the responsibility of a moving body. Collisions between the moving bodies can be avoided in this manner.

Technology for defining Voronoi regions is capable of providing logic ideally suited to cases in which plural moving bodies are envisaged. Moreover, there is no need to implement detailed action plans for each of the moving bodies, enabling the moving bodies to perform autonomous distributed decision-making while communicating with their surroundings.

Moreover, employing distributed processing instead of centralized processing reduces the calculation load, enabling solutions to be found in a realistic timeframe that is not dependent on scale.

Each moving body repeatedly moves toward the median point of the potential risk area within a Voronoi region surrounded by perpendicular bisectors between respective moving bodies. The definitions of the Voronoi regions are capable of changing from moment to moment.

SUMMARY

Technical Problem

However, in monitoring systems of related technology, including that of JP-A No. 2016-118996, in monitoring control involving plural moving bodies it is difficult to optimize selection of monitoring targets that require monitoring in cases in which the monitoring targets include unknown monitoring targets corresponding to regions in which a monitoring target has not hitherto been set, as well as known monitoring targets corresponding to regions that require continued monitoring.

An object of the present disclosure is to obtain a coverage device, a moving body, a control device, and a moving body distributed control program that are capable of performing monitoring control with mutual optimization even when monitoring targets include both unknown monitoring targets and known monitoring targets.

Solution to Problem

A coverage device of the disclosure includes: a sensor section that senses external environmental information; a defining section that defines an external environmental region, for which sensing information has not been obtained, as a target region; a determination section that determines the target region to be covered, based on a prediction result of prediction processing to predict a state quantity including uncertainty and an importance level of each target region, such that a surveillance performance according to the uncertainty of each target region and a tracking performance according to the importance level of each target region respectively become a predetermined level; and an instruction section that instructs allotting of actuators so as to provide coverage of the target region determined to be covered by the determination section.

According to the coverage device of the present disclosure, an external environmental region for which sensing information has not been obtained from the sensor section is defined as a target region. The target region is determined based on the prediction result of the prediction processing so as to make the surveillance performance and the tracking performance reach their predetermined levels.

For example, in cases in which target regions determined to require coverage include both an unknown target region that has hitherto not been a coverage target, and a known target region that has a coverage history and that requires continued coverage, an instruction is given to allot the actuators so as to provide coverage of the target regions such that the surveillance performance for the unknown target region and the tracking performance for the known target region reach the respective predetermined levels. This enables mutual optimization when performing monitoring control.

In the present disclosure, the surveillance performance of each target region is an Lx-norm of the uncertainty of the target region; and the tracking performance is a product of the importance level of the target region and a coverage ratio of the target region when covered.

Expressing the surveillance performance and the tracking performance as numerical values makes allotting of the actuators capable of simultaneous optimization more obvious.

In the present disclosure, the determination section determines that the target region is a region to be covered in a case in which a determination has been made that the target region is not covered globally.

This enables the target regions to receive global coverage.

In the present disclosure, the prediction processing includes: an acquisition section that acquires a transition of the state quantity of the target region as prior knowledge information; and a prediction section that predicts the state quantity of each of the target regions from a present point to a predetermined waypoint using a model to predict a change amount in the state quantity of each of the target regions from the state quantity of a corresponding target region that is defined based on the prior knowledge information acquired by the acquisition section and observation history for an actuator from the present point to a predetermined past point.

As the prediction processing to determine whether or not a target region requires coverage, the transition of the state quantity of the target region is acquired as the prior knowledge information, and the state quantity of each of the target regions from the present to a predetermined waypoint is predicted using the model to predict a change amount in the state quantity of each of the target regions. The model performs determination based on the acquired prior knowledge information and the observation history for the actuator from the present to a predetermined point in the past.

Predicting future transition from past transition enables prediction to be performed with a high level of precision.

The present disclosure further includes a gathering section that gathers observation history of a plurality of actuators. The gathering section gathers observation history of an actuator other than a given actuator, the actuator being capable of sharing coverage with the given actuator and the observation history that is used for determining the model is the observation history gathered by the gathering section.

Gathering observation history obtained by peripheral actuators to be employed in the prediction enables the prediction to be performed with a higher level of precision than when observation history acquired by a single actuator is employed to determine the model.

In the present disclosure, respective dedicated actuators address coverage of an unknown target region, which is a target region to be covered in order for the surveillance performance to satisfy the predetermined level, and coverage of a known target region, which is a target region to be covered in order for the tracking performance to satisfy the predetermined level.

Splitting responsibility in advance between a team responsible for coverage of unknown target regions and a team responsible for coverage of known target regions enables management control during allotting to be simplified. Note that the movement spaces (for example flight altitudes) may also be separated.

In the present disclosure, the target region is a blind spot region other than a region that the sensor section is capable of sensing, and the position and size of the blind spot region change over time.

If, for example, the sensor section used in the target region defined as an external environmental region for which sensing information has not been obtained is an imaging device, blind spot regions arise that are hidden by obstacles and cannot be captured. For example, if the obstacle is a vehicle, the blind spot region would change were the vehicle to move. Note that the type of obstacle depends on the type of sensor; for example if the sensor section is an infrared sensor, heat generating bodies become obstacles.

A moving body of the disclosure, by being disposed in a region of responsibility where the moving body does not interfere with other moving bodies, by including a sensor with a variable monitoring range, and by exchanging position information with other moving bodies, moves so as to change the region of responsibility while avoiding a collision. The moving body includes: a movement control section that, according to a predetermined prediction processing, moves the moving body based on prediction results of the prediction processing predicting a state quantity including an uncertainty and an importance level of respective monitoring targets within the region of responsibility of the moving body, such that a surveillance performance relating to the uncertainty of each of the monitoring targets within the region of responsibility of the moving body and a tracking performance relating to the importance level of each of the monitoring targets within the region of responsibility of the moving body satisfy respective predetermined levels.

The moving bodies of the present disclosure are moved based on the prediction results of predictions of a state quantity including uncertainty and an importance level of each monitoring target within the region of responsibility of the moving body itself, such that the surveillance performance relating to the uncertainty of the respective monitoring targets within the region of responsibility of the moving body itself and the tracking performance relating to the importance level of the respective monitoring targets within the region of responsibility of the moving body itself each reach the predetermined levels.

For example, in cases in which monitoring targets determined to require monitoring include both an unknown monitoring target that has hitherto not been a monitoring target, and a known monitoring target that has a coverage history and that requires continued monitoring, the moving bodies are moved such that the surveillance performance for the unknown monitoring target and the tracking performance for the known monitoring target reach the respective predetermined levels. This enables mutual optimization in monitoring control of both unknown monitoring target regions and known monitoring target regions.

A control device of the disclosure in a moving body distributed control system moves a plurality of moving bodies, the plurality of moving bodies, by respectively being disposed in regions of responsibility not interfering with each other, by respectively including a sensor with a variable monitoring range, and by exchanging position information with each other, moving so as to change the region of responsibility while avoiding collisions. The control device includes: a designation section that, according to a prediction processing, designates a monitoring target of a movement destination for a first moving body based on prediction results of the prediction processing predicting a state quantity including an uncertainty and an importance level for respective monitoring targets within the region of responsibility of the first moving body, such that a surveillance performance relating to the uncertainty of each of the monitoring targets within the region of responsibility of the first moving body and a tracking performance relating to the importance level of each of the monitoring targets within the region of responsibility of the first moving body satisfy respective predetermined levels; and a movement control section that moves the first moving body so that a monitoring target designated by the designation section falls within a monitoring range.

In the control device of the present disclosure, the designation section designates a monitoring target of a movement destination for each of the moving bodies based on prediction results predicting a state quantity including uncertainty and an importance level for respective monitoring targets within the region of responsibility of the moving body itself such that the surveillance performance relating to the uncertainty of each of the monitoring targets within the region of responsibility of the moving body itself and the tracking performance relating to the importance level of each of the monitoring targets within the region of responsibility of the moving body itself reach the respective predetermined levels.

The movement control section moves the moving body to bring a monitoring target designated by the designation section into the monitoring range.

For example, in cases in which monitoring targets determined to require monitoring include both an unknown monitoring target that has hitherto not been a monitoring target, and a known monitoring target that has a observation history and that requires continued monitoring, the monitoring targets configuring the movement destinations of the respective moving bodies are designated such that the surveillance performance for the unknown monitoring target and the tracking performance for the known monitoring target reach the respective predetermined levels. This enables mutual optimization in monitoring control of both unknown monitoring target regions and known monitoring targets.

The present disclosure further includes a determination section that determines, in a case in which the surveillance performance relating to the uncertainty of each of the monitoring targets within the region of responsibility of the first moving body and the tracking performance relating to the importance level of each of the monitoring targets within the region of responsibility of the first moving body satisfy the respective predetermined levels, to move the first moving body to a region of responsibility of a second moving body for which the surveillance performance relating to the uncertainty of each of the monitoring targets within the region of responsibility and the tracking performance relating to the importance level of each of the monitoring targets within the region of responsibility do not satisfy the respective predetermined levels. The movement control section moves the first moving body to the region of responsibility of the second moving body where the determination section has determined to move the first moving body.

Providing the determination section configured to determine, in cases in which the surveillance performance relating to the uncertainty of each of the monitoring targets within the region of responsibility of moving body itself and the tracking performance relating to the importance level of each of the monitoring targets within the region of responsibility of moving body itself have reached the respective predetermined levels, that the moving body itself should move to a region of responsibility of another moving body for which the surveillance performance relating to the uncertainty of each of the monitoring targets within the region of responsibility and the tracking performance relating to the importance level of each of the monitoring targets within the region of responsibility have not reached the respective predetermined levels enables the movement control section to move the moving body itself to the region of responsibility of the other moving body to which determination to be moved has been made.

The present disclosure further includes an information intercommunication section that, after the first moving body has been moved by being controlled by the movement control section, transmits information indicating a monitoring level of a monitoring target within the region of responsibility of the first moving body, and receives information indicating the monitoring level of the monitoring target within the region of responsibility of the second moving body; a judgement section that judges, based on the information received by the information intercommunication section, whether or not a condition for moving toward a monitoring target in the region of responsibility of the second moving body, which is outside of the current region of responsibility of the first moving body, has been met; and a mediation section that mediates, in order to finalize a moving body to move among a plurality of moving bodies including the first moving body, for which the judgement section has judged that the condition to move has been met.

The plural moving bodies are provided so as to be disposed in regions of responsibility not interfering with each other, and the each of the moving bodies is installed with a sensor capable of varying a monitoring range by moving within the regions of responsibility. The plural moving bodies exchange position information with each other to move to change the regions of responsibility while avoiding collisions. For example, Voronoi partition control may be applied as control to move the moving bodies while avoiding collisions.

The information intercommunication section exchanges information indicating the monitoring level of a monitoring target after being moved by the moving control means.

The judgement section make a judgement based on the received information as to whether or not the condition for moving to the region of responsibility of another moving body has been met. The mediation section executes mediation in order to finalize which moving body out of the plural moving bodies will move, including the moving body itself for which the judgement section has judged the condition to move to have been met.

This enables movement to a monitoring target region outside of the region of responsibility while avoiding collisions between the plural moving bodies, enabling a reduction in the coverage ratio of a monitoring target region.

In the present disclosure, the judgement section judges based on whether or not a collision with another moving body would occur on a movement path to an objective monitoring target.

The absence of any other moving bodies on the movement path to the objective monitoring target region is set as a condition. In cases in which another moving body is present on the movement path to the objective monitoring target region, collision avoidance is prioritized, and the movement is abandoned.

In the present disclosure, the mediation section mediates based on at least one of a time until the condition is met, a time required for movement, or demanded sensor functionality.

For example, in mediation by the mediation section based on the time until the condition is met, out of the plural moving bodies, the moving body for which the condition was met in the shortest time transmits information to limit the movement of the other moving bodies, thereby selecting this moving body. In mediation based on the time required for movement, the moving body capable of moving to the objective monitoring target soonest is selected. In mediation based on the demanded sensor functionality, for example, the moving body is selected based on the demanded information in cases in which respective moving bodies include a moving body that obtains captured visual information as information, and a moving body that obtains specific signals using an ultrasound sensor or an infrared sensor.

In the present disclosure, the prediction processing includes: an acquisition section that acquires a transition of the state quantity of the monitoring target as prior knowledge information; and a prediction section that predicts the state quantity of each of the monitoring targets from a present point to a predetermined waypoint using a model to predict a change amount in the state quantity of each of the monitoring targets from the state quantity of each of the monitoring targets, the model being determined based on the prior knowledge information acquired by the acquisition section and observation history information for the moving body from the present point to a predetermined point in the past.

Predicting future transition from past transition enables prediction to be performed with a high level of precision.

The present disclosure further includes a gathering section that gathers observation history information of the plurality of moving bodies. The gathering section gathers observation history information of a moving body other than a given moving body, the other moving body being capable of sharing monitoring with the given moving body and the observation history information that is used for determining the model is the observation history information gathered by the gathering section.

Gathering observation history information obtained by peripheral moving bodies to be employed in prediction enables the prediction to be performed with a higher level of precision than when observation history information obtained by a single moving body is employed in the prediction.

In the present disclosure, respective dedicated moving bodies independently address monitoring of an unknown monitoring target that is a monitoring target requiring monitoring in order for the surveillance performance to satisfy the predetermined level, and monitoring of a known monitoring target that is a monitoring target requiring monitoring in order for the tracking performance to satisfy the predetermined level.

Splitting responsibility in advance between a team responsible for monitoring of unknown monitoring targets and a team responsible for monitoring of known monitoring targets enables management control during allotting to be simplified. Note that the movement spaces (for example flight altitudes) may also be separated.

In the present disclosure, each surveillance performance is an Lx-norm of the uncertainty of a monitoring target and each tracking performance is the product of the importance level of the monitoring target and a coverage ratio when monitoring a monitoring target.

Expressing the surveillance performance and the tracking performance as numerical values makes allotting of the actuators capable of simultaneous optimization more obvious.

The present disclosure further includes an acquisition section that acquires movement speed information and movement plan information relating to the monitoring target; a determination section that determines a speed difference between the movement speed of the monitoring target and a movement speed of the moving body based on the movement speed information acquired by the acquisition section; an identification section that, based on the movement plan information acquired by the acquisition section, identifies an estimated position of the monitoring target after a predetermined time that is estimated from a current position of the monitoring target, and an estimated movement route along which movement of the monitoring target is estimated to the estimated position after the predetermined time in a case in which the movement speed of the monitoring target is determined to be faster than the movement speed of the moving body according to a determination result by the determination section; and a shortcut control section that controls such that the moving body moves toward the estimated position after the predetermined time identified by the identification section and the moving body also moves along the estimated movement route.

A monitoring target tracking control device that controls the moving bodies performs basic control to move plural moving bodies. Each moving body is disposed in a region of responsibility where the moving body will not interfere with other moving bodies, is installed with a sensor section with a variable monitoring range, and is configured to exchange position information with the other plural moving bodies in order to move to change the region of responsibility while avoiding collisions.

Under this basic control, the acquisition section acquires the movement speed information and movement plan information relating to a monitoring target. The speed difference between the movement speed of the monitoring target and the movement speed of the moving body is determined based on the acquired movement speed information.

In cases in which the movement speed of the monitoring target has been determined to be faster than the movement speed of the moving body from a determination result of the determination section, based on the movement plan information acquired by the acquisition section the identification section identifies the estimated position of the monitoring target estimated for the predetermined timing ahead of the current position of the monitoring target, and the estimated movement route estimated for movement of the monitoring target to the estimated position at the predetermined timing ahead. The shortcut control section performs control such that the moving body moves to the estimated position at the predetermined timing ahead as identified by the identification section, and also such that the moving body moves in a manner reflecting the estimated movement route.

This enables monitoring of the monitoring target by the moving bodies to be continued by monitoring target tracking control even in cases in which the movement speed of the monitoring target is faster than the movement speed of the moving body.

In the present disclosure, the identification section identifies an estimated position selected from a plurality of important waypoints that are present on a predetermined movement route of the monitoring target and that are prioritized for monitoring.

Identifying the estimated position selected from the important waypoints present on the movement route of the monitoring target that are prioritized for monitoring enables lag-free monitoring of important monitoring regions.

In the present disclosure, the shortcut control section calculates a remaining time for the moving body to arrive at the estimated position earlier than the monitoring target in a case in which the moving body is moved to the estimated position along a shortest route and continues to track movement of the monitoring target so as to minimize both the calculated remaining time and a distance to the monitoring target.

In the present disclosure, the shortcut control section controls such that the moving body moves along the movement route, the movement route being the estimated movement route and being a circular arc shape connecting a current position of the moving body to the estimated position after the predetermined time identified by the identification section.

When the estimated position has been identified, although movement in a straight line would enable the estimated position to be reached in the shortest amount of time, the remaining time to arrive at the estimated position earlier than the monitoring target is calculated, and movement to track the monitoring target is continued so as to minimize the calculated remaining time and the distance to the tracking target. For example, in contrast to movement in a straight line, movement along a circular arc shaped path keeping as close as possible to the monitoring target is performed so as to arrive ahead. Although the level of monitoring (coverage ratio) of the monitoring target is not ideal, it is possible to maintain the minimum required monitoring of the monitoring target along the movement path of the monitoring target.

Advantageous Effects

The present disclosure enables monitoring control to be performed with mutual optimization even when monitoring targets include both unknown monitoring targets and known monitoring targets.

BRIEF DESCRIPTION OF DRAWINGS

FIG. 7 is a graph illustrating characteristics in a case in which state quantities and uncertainty of sampled points at respective coordinates are expressed using positive and negative numerical values.

FIG. 8 is a flowchart illustrating a main routine of moving body distributed control executed by a distributed control section according to an exemplary embodiment.

FIG. 10A is a flowchart of control illustrating a prediction control subroutine to elaborate on the processing of step 306 in FIG. 8.

FIG. 10C is a flowchart of control illustrating an information provision subroutine to elaborate on the processing of step 310 in FIG. 8.

FIG. 12A is a schematic view illustrating a moving body distributed control system according to a modified example of an exemplary embodiment, illustrating a state in which a fixed camera is incorporated into an autonomous distributed network.

FIG. 13 is a plan view illustrating a moving body distributed control system according to an Example 1 of an exemplary embodiment, illustrating a region in which moving bodies move.

FIG. 18 is a flowchart illustrating a potential risk area monitoring control routine according to Example 1 of the exemplary embodiment.

DESCRIPTION OF EMBODIMENTS

Figure 1:
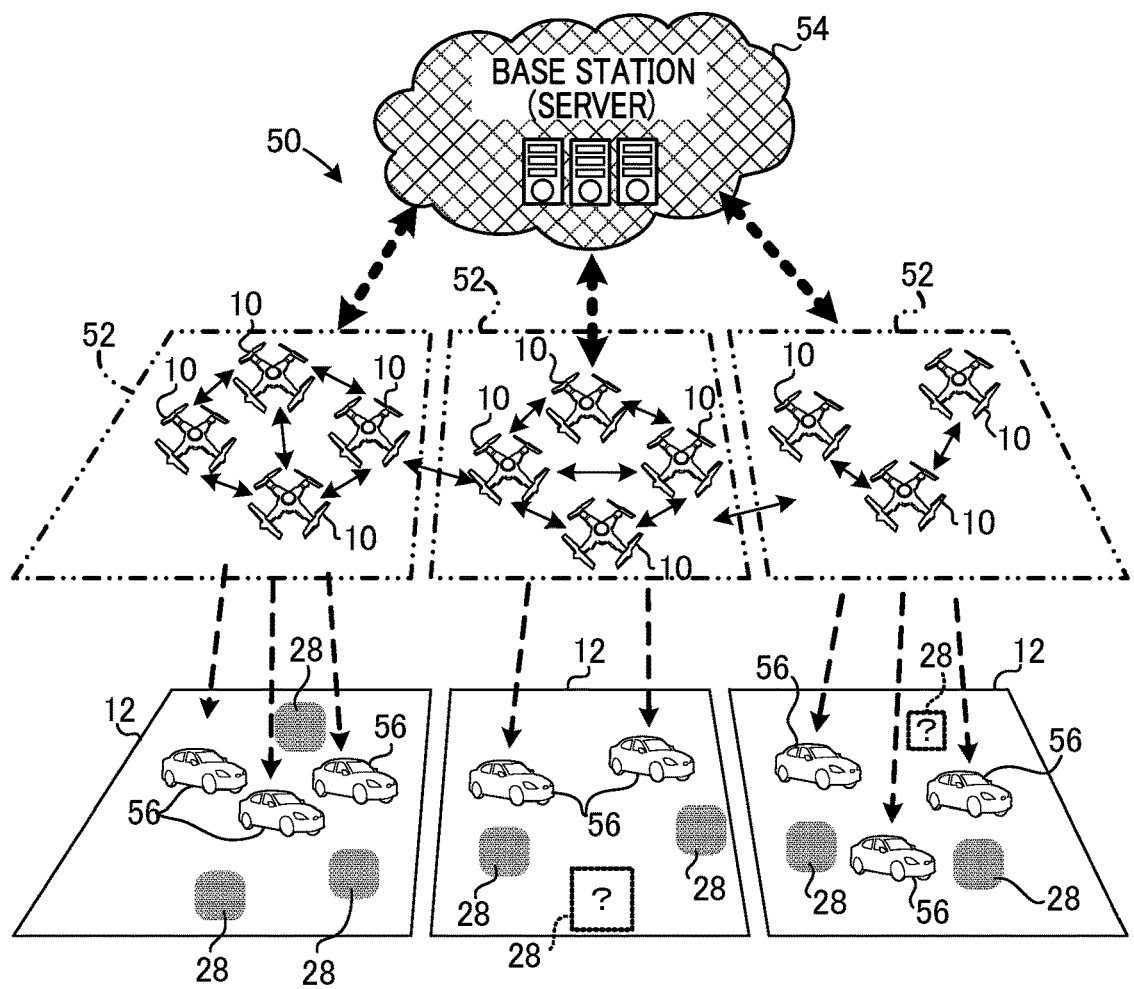
FIG. 1 is a schematic view of a moving body distributed control system according to an exemplary embodiment.

FIG. 1 is a schematic view of a moving body distributed control system 50 according to the present exemplary embodiment.

The moving body distributed control system 50 of the present exemplary embodiment is illustrated by plural moving bodies 10, and plural regions 12 within which the moving bodies 10 move in order to perform monitoring.

In FIG. 1, the plural moving bodies 10 are categorized into three groups 52. The groups 52 are responsible for monitoring three respective regions 12.

The group configurations of the moving bodies 10, the number of monitoring regions, and the like are not limited to being in threes as in FIG. 1. Configuration may be made in which a single group 52 monitors a single region 12, or configuration may be made in which two, or four or more groups 52 each monitor two, or four or more regions 12.

Figure 2:
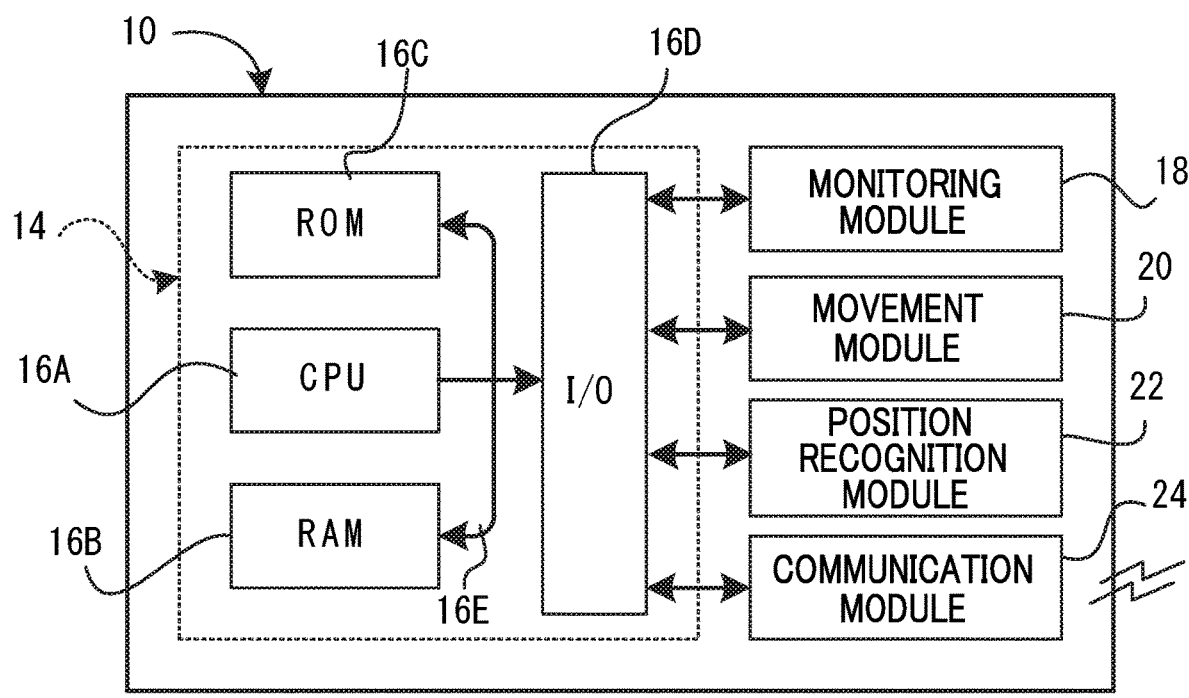
FIG. 2 is a block diagram illustrating a control system for operating moving bodies in a moving body distributed control system according to an exemplary embodiment.

FIG. 2 is a block diagram illustrating a control system for operating the moving bodies 10 (see FIG. 1) applied with the present exemplary embodiment.

Each of the moving bodies 10 is capable of unmanned movement within the range of the corresponding region 12, and is installed with a control device 14 provided with a microcomputer to execute control, including of this movement, as illustrated in FIG. 2.

The microcomputer of the control device 14 includes a CPU 16A, RAM 16B, ROM 16C, an input/output port (I/O) 16D, and a bus 16E such as a data bus or control bus connecting these components together. A monitoring module 18, a movement module 20, a position recognition module 22, and a communication module 24 are connected to the I/O 16D.

The control device 14 loads and executes a moving body distributed control program pre-stored in the ROM 16C in the CPU 16A, for example, in order to control operation of the monitoring module 18, the movement module 20, the position recognition module 22, and the communication module 24. Note that the distributed control program may be recorded on a non-transitory recording medium such as a CD-ROM or a DVD and loaded into the ROM 16C from the non-transitory recording medium.

Monitoring Module 18

A camera configured to image a specific monitoring range (field of view) from the position of the moving body 10 is a typical example of a device applied as the monitoring module 18.

The monitoring module 18 is not limited to a camera that performs image capture, and may, for example, be configured to emit electromagnetic waves (radar, laser, ultrasound, or the like) to detect geographical features (landmarks) or the like.

Movement Module 20

Each of the moving bodies 10 of the present exemplary embodiment is a flying object (for example a drone), and includes plural propellers driven by independent drive sources (motors) as devices applied as the movement module 20. The moving body 10 is capable of flying in a direction toward a destination and stopping (hovering) at a spatial destination position by controlling drive of the motors.

Note that the moving bodies 10 are not limited to flying objects, and configuration may be made with movement modules 20 for ground-based or water-based movement. Moreover, plural devices may be employed in combination. As an even broader concept, fixed-installation monitoring cameras may also be included under the definition of the movement module 20 if incorporated into an autonomous distributed network.

Note that such monitoring cameras may have a fixed imaging range, or may be provided with a swinging mechanism to enable the monitoring range of the monitoring module 18 to be changed.

Position Recognition Module 22

The position recognition module 22 has a function of recognizing the position of the moving body 10 itself. The position recognition module 22 includes a sensor for at least one out of GPS, laser, radar, ultrasound, motion capture, a camera, wireless communication, or wireless signal strength (distance information) as a device to obtain position information.

The position recognition module 22 recognizes the position of the moving body 10 itself using three-dimensional spatial coordinates or the like based on detection results (detection signals) of the sensor.

As well as recognizing the position of the moving body 10 itself, the position recognition module 22 also acquires position information relating to other moving bodies 10 through the communication module 24, described below, and calculates distances therebetween in order to recognize the relative positional relationships of the plural moving bodies 10.

Communication Module 24

A wireless communication-equipped device is provided as a device of the communication module 24. Functionality of the wireless communication of the communication module 24, which is used to communicate between a base station (server) 54 (see FIG. 1) performing overall monitoring management and/or other moving bodies 10, includes a position information exchange section that exchanges position information, a coverage ratio exchange section that exchanges information (coverage ratio information) relating to the monitoring level (referred to as "coverage ratio") of a designated monitoring target (also referred to as a "potential risk area" or "target"), and a mediation information exchange section that exchanges mediation information relating to the allotting of potential risk areas. Note that such communication may also be performed exclusively between the moving bodies 10, without involving the base station (server) 54.

Note that the base station 54 is not a necessity if the moving body distributed control system 50 can be achieved by mutual information exchange functionality of the respective moving bodies 10. The installation or otherwise of the base station 54 may be decided in consideration of the amount of past information (big data) to be managed.

The mediation information is information used to determine whether or not a moving body 10 will move toward a potential risk area, and distinguishes potential risk areas using labels (positive or negative). For example, a potential risk area defined as "positive" requires monitoring, while a potential risk area defined as "negative" does not require monitoring. The potential risk areas are regions that can be designated as either surveillance regions or tracking regions based on determination through predictive control executed in the present exemplary embodiment.

The wireless communication of the communication module 24 further includes a monitoring information transmission section that transmits monitoring results of the monitoring module 18 (for example captured information in the case of a camera) to the base station 54.

As illustrated in FIG. 1, one example of the regions 12 monitored by the moving bodies 10 is a road (parking lot or the like) where vehicles 56 are present. The moving bodies 10 monitor the road on which the vehicles 56 travel in order to provide the vehicles 56 (drivers) with spatial data in which no blind spots are present.

Potential risk areas 28 present in the regions 12 illustrated in FIG. 1 include known potential risk areas 28 and unknown potential risk areas 28.

The known potential risk areas 28 (shaded within solid rectangular lines in FIG. 1) are regions (tracking regions) toward which the moving bodies 10 are guided based on an importance level, described later, since it is necessary to track the potential risk area.

The unknown potential risk areas 28 (illustrated by question marks inside dotted rectangular lines in FIG. 1) are regions (surveillance regions) toward which the moving bodies 10 need to be guided based on a surveillance performance, described later.

The unknown potential risk areas 28 include regions from which a known potential risk area 28 has been expunged from a history with the passage of time so as to become an unknown potential risk area 28.

Information Processing Control by Distributed Control Program

Figure 3:
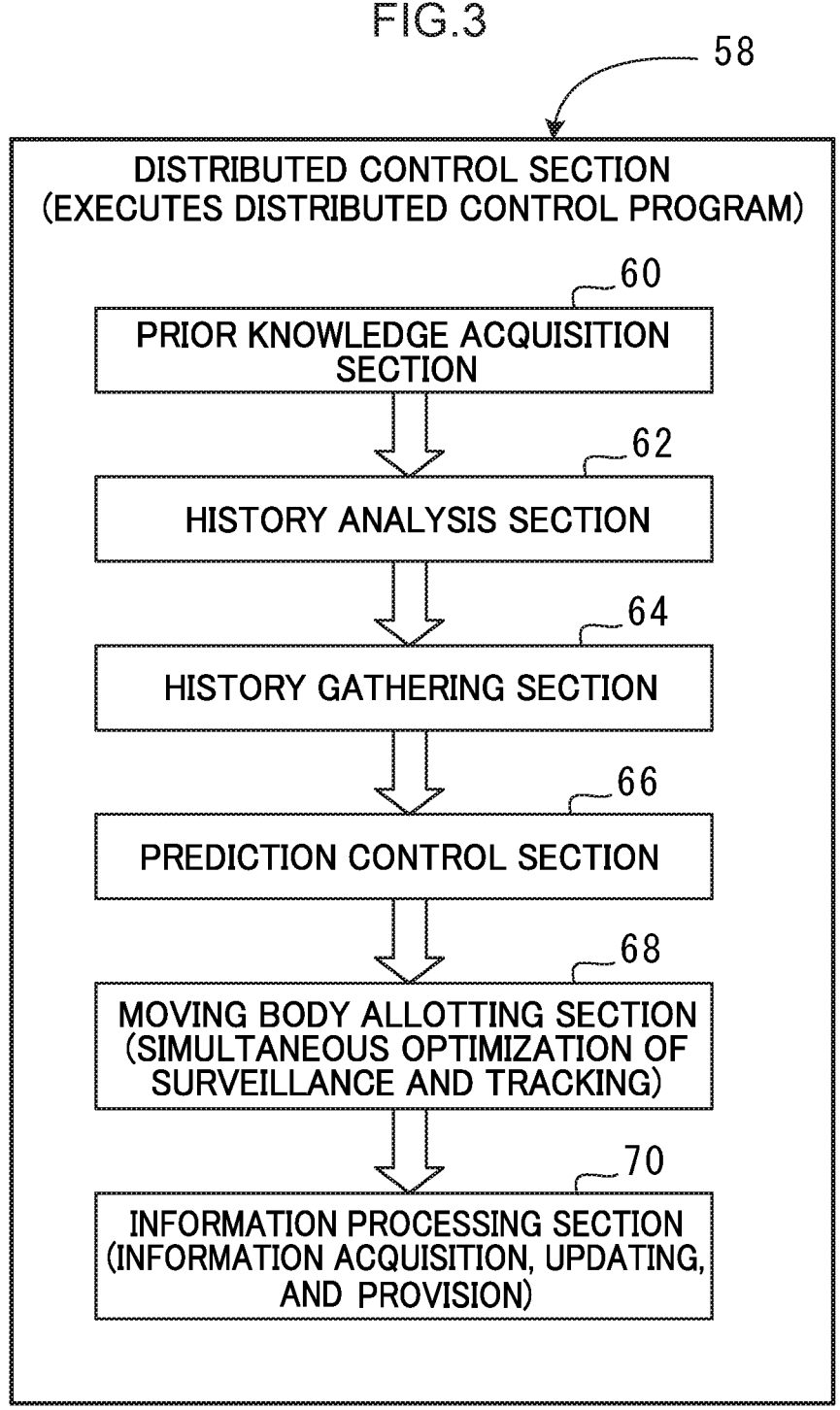
FIG. 3 is a block diagram illustrating execution of a distributed control program executed by a moving body CPU, classified by function.

FIG. 3 is a block diagram illustrating functionality of a distributed control program (referred to hereafter as a distributed control section 58) executed by the CPU 16A (see FIG. 2) of each moving body 10. Although the distributed control section 58 illustrated in FIG. 3 is not limited to a hardware configuration for distributed control, the distributed control section 58 be realized by a dedicated device such as an Application Specific Integrated Circuit (ASIC), or a hardware configuration such as a programmable logic device instead of by a microcomputer, or may be realized by a combination of plural different types of hardware configuration.

As illustrated in FIG. 3, the distributed control section 58 includes a prior knowledge acquisition section 60. The prior knowledge acquisition section 60 accesses a big data management server (this may be either offline or online) in the base station 54 (see FIG. 1) or the like, and acquires prior knowledge information relating to the regions 12 in advance.

The prior knowledge information relating to each of the regions 12 includes at least parameters used when determining dynamics of the potential risk areas 28 in the region 12. The prior knowledge information relating to the regions 12 further includes information relating, for example, to the frequency with which potential risk areas 28 appear in the region 12, how such potential risk areas 28 behave, how movement of the potential risk areas 28 is distributed, or where importance levels are highest.

The following formula (Equation 1) is established when a state quantity of a potential risk area 28 is denoted x.

$$\dot{x}=f(q,x) \qquad \text{Equation 1}$$

wherein $\dot{x}$: predicted target dynamics (including deterministic elements and probabilistic elements)

x: target state quantity q: parameter for determining target dynamics (for example in a linear discrete-time system, the variable of matrix F, G in $x[k+1]=F(q) \times x[k]+G(q)$ would be denoted q)

The state quantity x of the potential risk area 28 includes the uncertainty and importance level of the potential risk area 28.

Figure 4A:
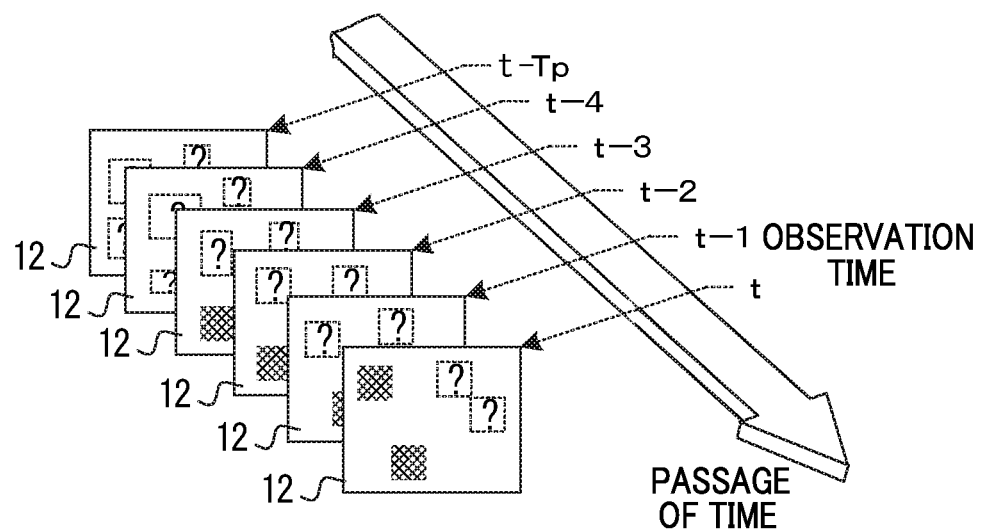
FIG. 4A is a schematic diagram illustrating an observational history for a moving body according to an exemplary embodiment, the observational history illustrating transition of potential risk areas within a region running back in time from the current time.

The prior knowledge information acquisition section 60 is connected to a history analysis section 62. As illustrated in FIG. 4A, the history analysis section 62 acquires an observational history of each of the moving bodies 10 for a predetermined timeframe (in the present exemplary embodiment, a timeframe corresponding to a number of instances Tp at unit time intervals running back in time from the current time t (namely, t−Tp)) for each of the moving bodies 10. For example, if the number of instances Tp is 100, an observational history corresponding to the past 100 frames would be acquired.

Precision increases the finer the time resolution (unit time) of acquisition, whereas the processing speed increases the lower the time resolution. The time resolution may be decided according to the processing power of the CPU 16A (see FIG. 2), the precision with which the regions 12 to be monitored are monitored, and so on. The number of instances Tp may be decided in consideration of the rate of change of the potential risk areas within the region 12 and the like.

For example, the observational history includes both known potential risk areas 28 and unknown potential risk areas 28 as described above. It is expected that the state quantities of these potential risk areas 28 will change over time.

The history analysis section 62 is used to ascertain, for each of the moving bodies 10, the state quantities of the known potential risk areas 28 and the unknown potential risk areas 28 in the timeframe spanning back in time by the last number of instances Tp at unit time intervals from the current time t.

The observational history of potential risk areas 28 by an $i^{th}$ moving body 10 (i being a number (positive integer) allotted to each of the plural moving bodies 10 present in a region 12 under their responsibility) can be expressed as in the following formula (Equation 2).

$$X_i = (x_i(t), x_i(t-1), \ldots, X_i(t-T_p)) \qquad \text{Equation 2}$$

wherein

Figure 4B:
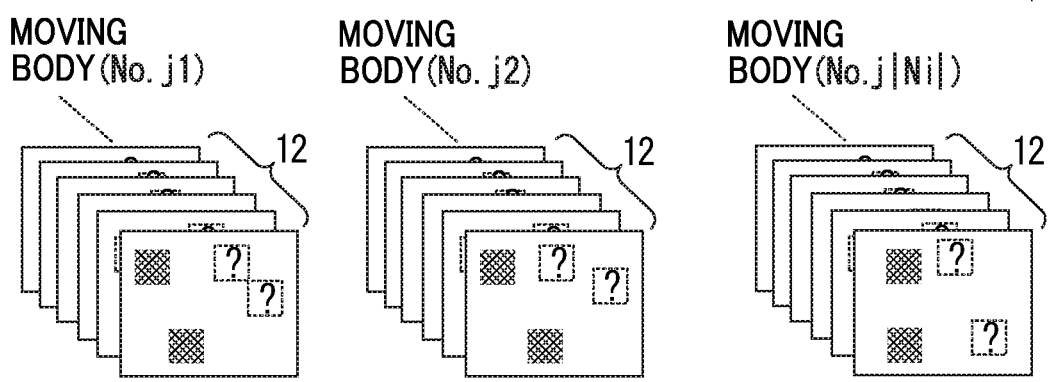
FIG. 4B is a schematic diagram illustrating a gathered state of observational histories from plural moving bodies.

Xi: observational history of $i^{th}$ moving body t: current time t−1: timing at one unit time before current time t−Tp: timing at Tp unit times before current time The history analysis section 62 is connected to a history gathering section 64. Information (Xi) corresponding to each of the moving bodies 10 analyzed by the history analysis section 62 is gathered in the history gathering section 64. For example, as illustrated in FIG. 4B, a sum of sets of including information relating to the observational histories of the moving body 10 itself as well as information relating from other moving bodies 10 in the vicinity thereof is calculated (see Equation 3).

$$\bigcup_{j \in N_i} X_j \tag{3}$$

wherein j: total number of moving bodies

The history gathering section 64 is connected to a prediction control section 66. The gathered information is sent to the prediction control section 66.

Figure 5:
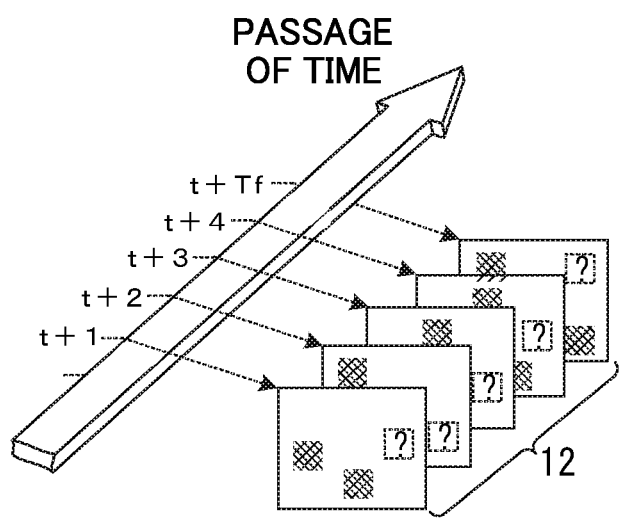
FIG. 5 is a schematic diagram illustrating observational prediction of transition of potential risk areas within a region going forward from the current time for a moving body according to an exemplary embodiment.

As illustrated in FIG. 5, the prediction control section 66 predicts future dynamics q' of each moving body 10 for a predetermined timeframe (in the present exemplary embodiment, a timeframe going forward from the current time t by a number of instances Tf at unit time intervals (namely, t+Tf)) for each of the moving bodies 10. For example, if the number of instances Tf is 100, future observational predictions corresponding to 100 frames would be acquired.

Precision increases the finer the time resolution (unit time) of acquisition, whereas the processing speed increases the lower the time resolution. The time resolution may be decided according to the processing power of the CPU 16A (see FIG. 2), the monitoring precision with which the regions 12 to be monitored are monitored, and so on. The number of instances Tf may be decided in consideration of the rate of change of the potential risk areas within the region 12 and the like. Moreover, the number of instances Tf does not necessarily have to be correlated to the number of instances Tp applied for the history analysis section 62.

For example, the future prediction includes both known potential risk areas 28 and unknown potential risk areas 28 as described above. It is expected that the positions of these potential risk areas 28 will change over time.

The prediction control section 66 is used to ascertain (predict), for each of the moving bodies 10, the state quantities of the known potential risk areas 28 and the unknown potential risk areas 28 in the timeframe spanning the next number of instances Tf at each unit time from the current time t.

Prediction of the state quantities of potential risk areas 28 by an $i^{th}$ moving body 10 (i being a number (positive integer) allocated to each of the plural moving bodies 10 present in a region 12 under their responsibility) can be expressed as in the following formula (Equation 4).

$$(\hat{x}_i(t+1), \ldots, \hat{x}_i(t+T_f)) \tag{4}$$

Next, change amounts in the state quantities of these potential risk areas are predicted as expressed in the following formula (Equation 5), using the parameter qi used in determining dynamics of the potential risk areas for each moving body 10.

$$\dot{\hat{x}}_i = f(q_i, x_i) \tag{5}$$

$$(i = 1, \ldots, N_{agent})$$

The prediction control section 66 is connected to a moving body allotting section 68. Prediction results of the prediction control section 66 (estimated dynamics q') are sent to the moving body allotting section 68.

The moving body allotting section 68 determines potential risk areas that require monitoring so as to satisfy predetermined levels for both a surveillance performance and a tracking performance. The plural moving bodies 10 are allocated the potential risk areas determined to be potential risk areas that require monitoring (simultaneous optimization).

The respective moving bodies 10 subjected to simultaneous optimization start moving toward their allocated potential risk areas to monitor the potential risk areas.

Surveillance Performance

The surveillance performance is a value determined according to the uncertainty of the information relating to each potential risk area 28 that requires monitoring in the region 12. The surveillance performance is, for example, an Lx-norm of a vector expressing the uncertainty of the information relating to the respective potential risk area 28.

Tracking Performance

The tracking performance represents the product of the importance level of a potential risk area and the coverage ratio (an overlap rate of potential risk areas and moving bodies 10). The tracking performance enables, for example, a judgement to be made to continue tracking a known potential risk area with a high importance level, or whether to continue or stop tracking of a known potential risk area with a low importance level.

In the present exemplary embodiment, the surveillance performance and the tracking performance are mutually analyzed to determine potential risk areas that require monitoring, and to allot the plural moving bodies 10 to potential risk areas determined to be potential risk areas that require monitoring.

Figure 6A:
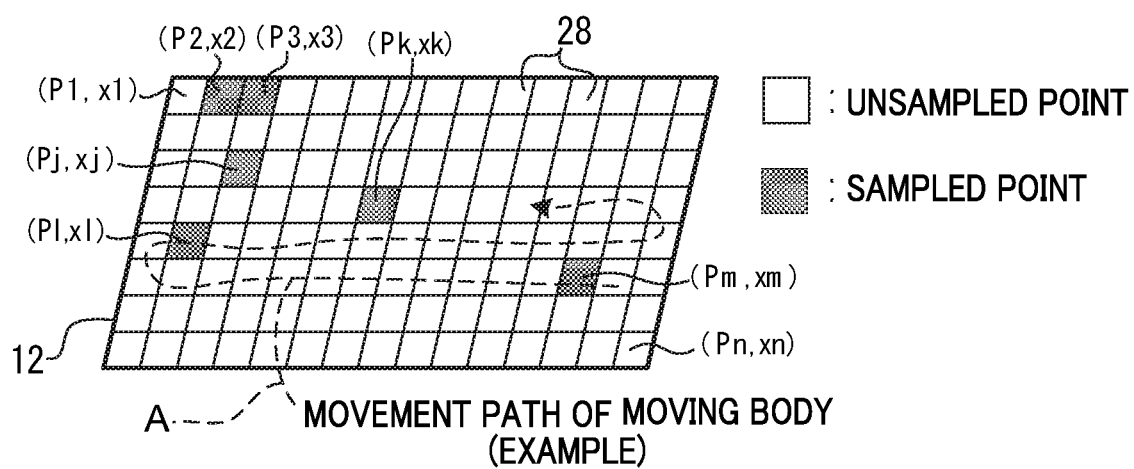
FIG. 6A is a coordinate plot illustrating sampled points in a region within which moving bodies according to an exemplary embodiment move.

For example, as illustrated in FIG. 6A, each region 12 is classified into rectangular potential risk areas 28, and labels are used to distinguish respective points P. A moving body 10 moves as illustrated by the intermittent line A.

Each point P is set with a state quantity x (distinguished by the label of the point P). The potential risk areas 28 include unsampled points (white sectors) and sampled points (shaded sectors).

Figure 6B:
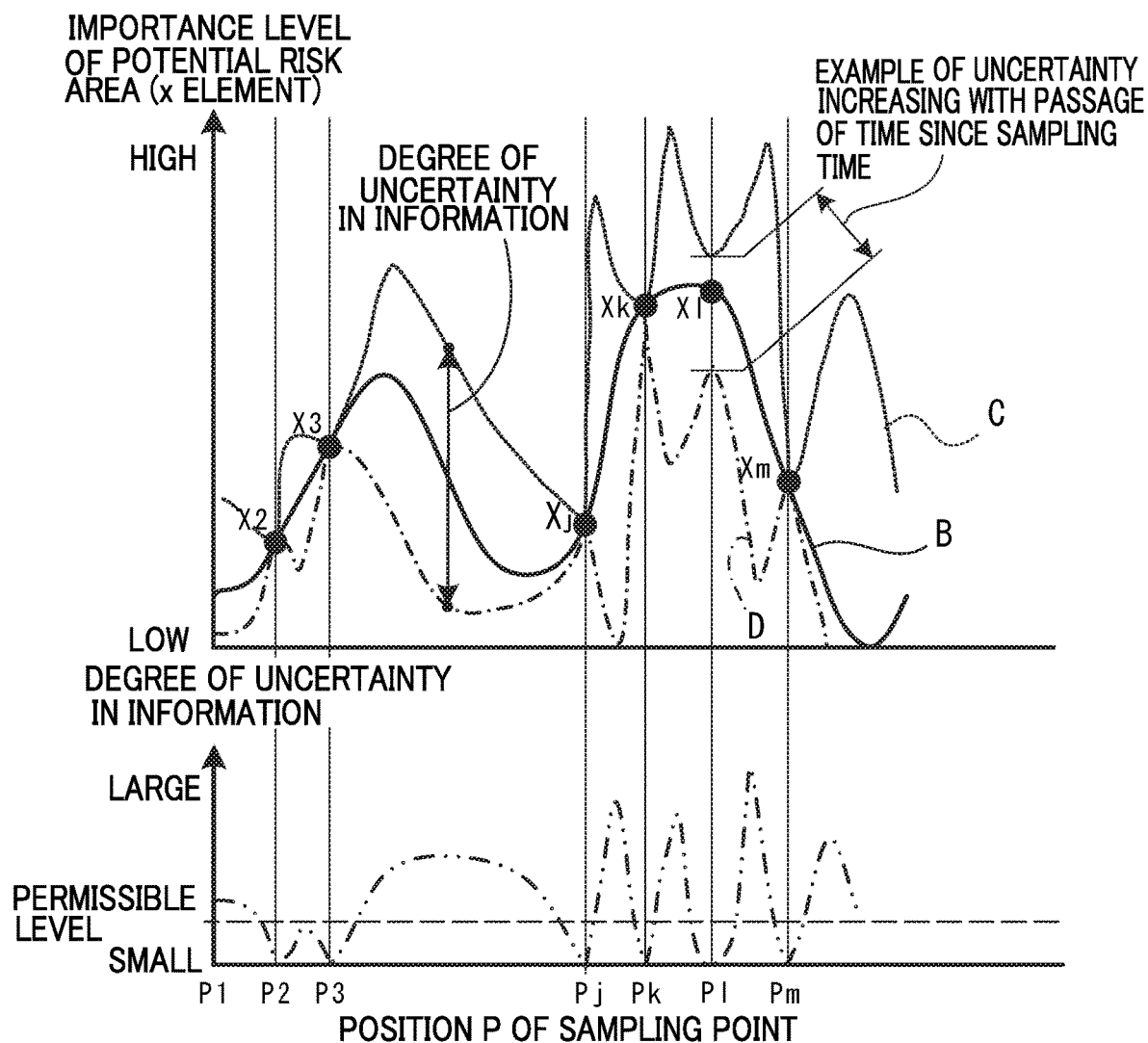
FIG. 6B illustrates graphs illustrating characteristics of norm values representing importance levels and uncertainty dependent on state quantities of sampled points at respective coordinates.

From the illustration of FIG. 6A, uncertainty can be expressed in terms of uncertainty of information, as illustrated in FIG. 6B.

In the upper graph in FIG. 6B, a characteristics curve B illustrated by a solid line represents the importance levels of the potential risk areas, as estimated based on the sampled points in FIG. 6A (for which uncertainty is at a minimum value). When the characteristics curve B expresses a high importance level, the importance level of the corresponding potential risk area is estimated to be high.

However, the larger the number of unsampled points present, the greater the uncertainty, resulting in greater divergence from the characteristics curve B illustrated by the solid line. This causes a large discrepancy in importance levels, as between the characteristics curve C (illustrated by a dashed line) and the characteristics curve D (illustrated by a single-dotted dashed line). This large discrepancy corresponds to the magnitude of uncertainty.

Greater emphasis is placed on surveillance of points with a large degree of uncertainty, and points with a high importance level. A permissible level is set in advance for the uncertainty (norm value), and the moving bodies are guided toward potential risk areas where the uncertainty is greater than the permissible level, in order to lower the surveillance performance (uncertainty).

Even if the uncertainty is lower than the level, points having a high importance level are subjected to further tracking.

The moving bodies 10 are allotted in this manner in order to perform simultaneous optimization for both the surveillance performances and tracking performance.

Note that as illustrated in FIG. 6B, as time elapses after sampling a sampled point (for example point P1), the uncertainty increases with the passage of time. Namely, the point P1 is an example where a rate of forgetting is set so as to gradually deviate from the characteristics curve B illustrated by the solid line, from the perspective that old data is less reliable.

As illustrated in FIG. 7, the uncertainty of unknown potential risk areas may be simply expressed using negative numbers (for example less than 0 down to −1), and the importance levels of known potential risk areas may be simply expressed using positive numbers (for example from 0 to +1). A distinction may be drawn such that a known potential risk area in which a target object (for example a vehicle) is present may be expressed by "+1", and a known potential risk area in which a target object is not present may be expressed by "0".

As illustrated in FIG. 3, the moving body allotting section 68 is connected to an information processing section 70. The information processing section 70 acquires information from the moving bodies 10 allotted by the moving body allotting section 68, and provides reproduced spatial data in which no blind spots are present to a driver of a vehicle 56 (see FIG. 1) present in the region 12 or the like, and warns of unexpected situations.

Explanation follows regarding operation of the present exemplary embodiment, with reference to the flowcharts illustrated in FIG. 8 to FIG. 10C.

FIG. 8 is a flowchart illustrating a main routine of moving body distributed control executed by the distributed control section 58.

At step 300, the prior knowledge information is acquired (see FIG. 9A, described later).

At the next step 302, the observational histories are analyzed (see FIG. 9B, described later).

At the next step 304, the observational histories of plural of the moving bodies 10 are gathered (see FIG. 9C, described later).

At the next step 306, the optimal value of the parameter q for determining dynamics of the potential risk areas 28 is obtained, and the state quantities of the potential risk area 28 are predicted (see FIG. 10A, described later).

At the next step 308, potential risk areas that require monitoring are determined based on the prediction results for the state quantity of the potential risk area 28, and the moving bodies 10 are allocated (see FIG. 10B, described later).

At the next step 310, the acquired information is applied. Namely, the information is provided to users that require it.

Figure 9A:
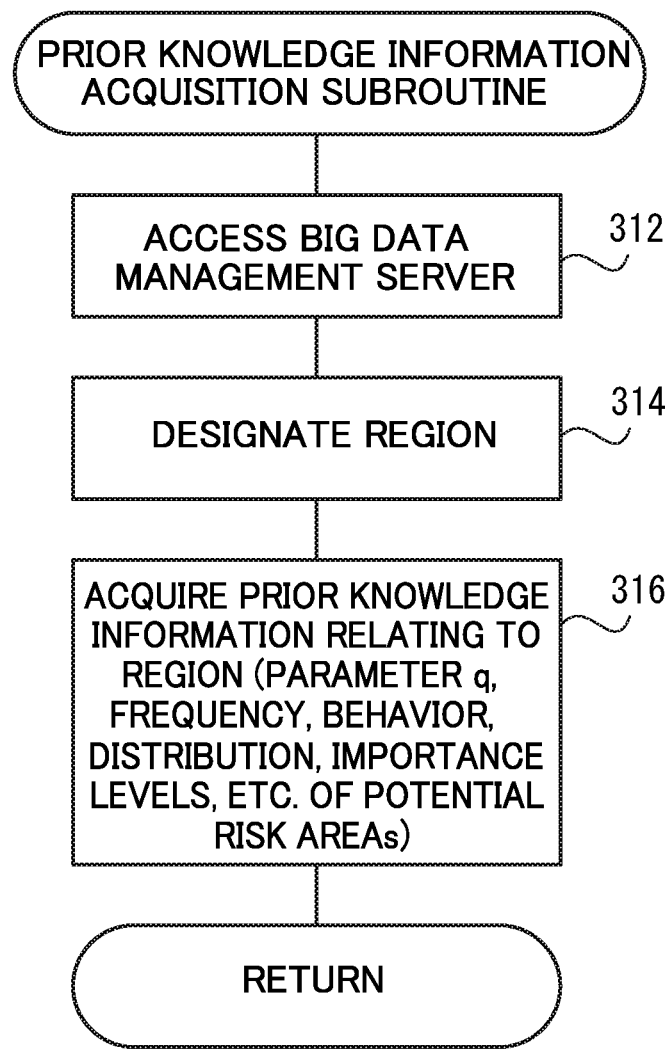
FIG. 9A is a flowchart of control illustrating a prior knowledge information subroutine to elaborate on the processing of step 300 in FIG. 8.

FIG. 9A is a flowchart of control illustrating a prior knowledge information subroutine to illustrate the processing of step 300 in FIG. 8 in more detail.

At step 312, the big data management server is accessed, and processing transitions to step 314, where a region 12 to be monitored is designated. Processing then transitions to step 316.

At step 316, the parameter q used for determining the dynamics of the potential risk areas 28 is acquired from the big data management server as prior knowledge information relating to the region 12 designated at step 314. Moreover, for example, information relating to the frequency with which potential risk areas 28 appear in the region 12, how such potential risk areas 28 behave, how movement of the potential risk areas 28 is distributed, or where the importance level is highest is also acquired, and then the routine is ended.

Figure 9B:
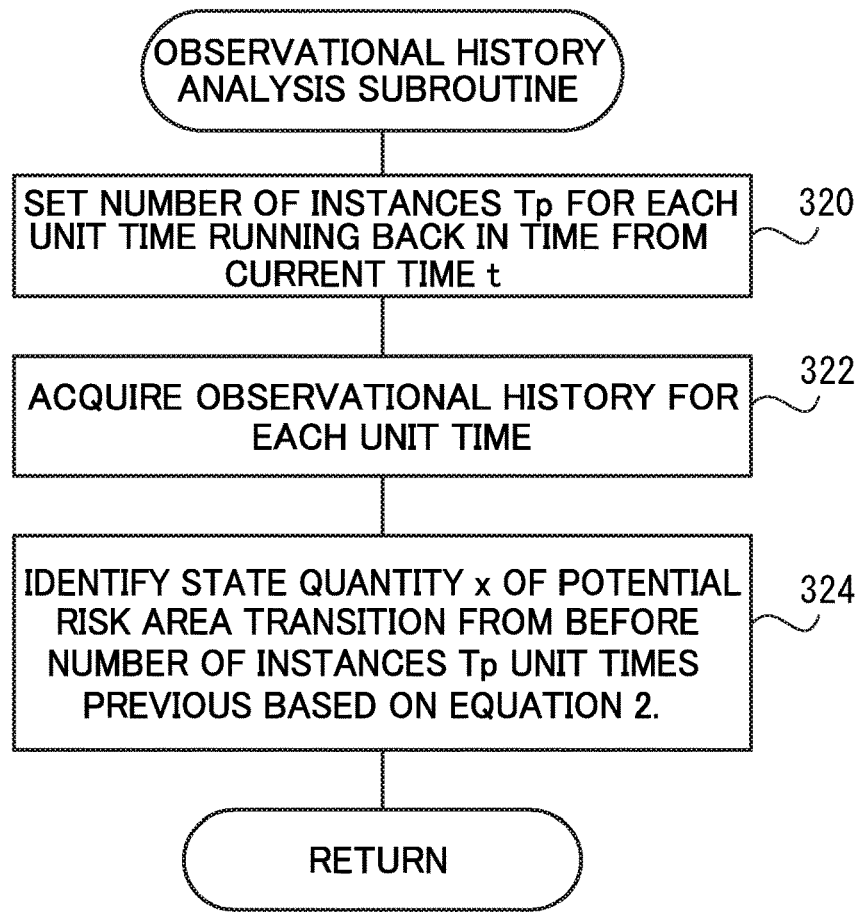
FIG. 9B is a flowchart of control illustrating an observational history analysis subroutine to elaborate on the processing of step 302 in FIG. 8.

FIG. 9B is a flowchart of control illustrating an observational history analysis subroutine to illustrate the processing of step 302 in FIG. 8 in more detail.

At step 320, the number of instances Tp running back in time from the current time t at unit time intervals is set, and processing transitions to step 322.

At step 322, the observational history for each unit time interval is acquired, and processing transitions to step 324.

At step 324, a state quantity x representing the transition of the potential risk areas 28 since Tp instances of the unit time previously is identified based on the formula of Equation 2, and the routine is ended.

Figure 9C:
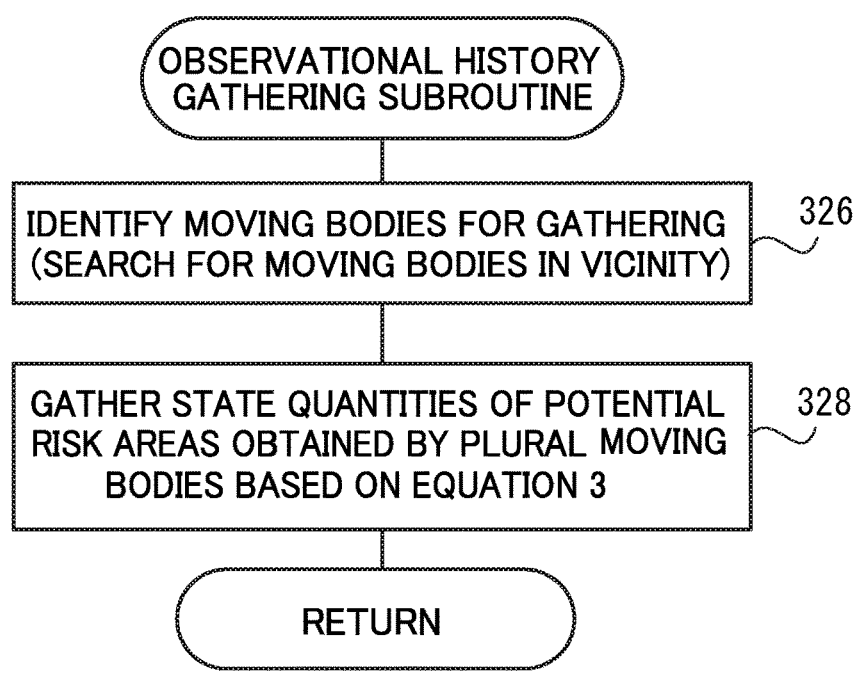
FIG. 9C is a flowchart of control illustrating an observational history gathering subroutine to elaborate on the processing of step 304 in FIG. 8.

FIG. 9C is a flowchart of control illustrating an observational history gathering subroutine to illustrate the processing of step 304 in FIG. 8 in more detail.

At step 326, first, the moving bodies 10 subject to the gathering are identified. Although gathering may be performed for all of the moving bodies 10 in a single group 52, limiting the gathering to other moving bodies 10 positioned in the vicinity of the moving body 10 itself prevents a drop in precision, thereby enabling the precision of information to be efficiently raised.

At the next step 328, the state quantities of the potential risk areas as obtained by the plural moving bodies 10 are gathered based on the formula of Equation 3, and the routine is ended. This enables the precision of the observational history ascertained by the moving body 10 itself to be raised.

FIG. 10A is a flowchart of control illustrating a prediction control subroutine to illustrate the processing of step 306 in FIG. 8 in more detail.

At step 330, the optimal value of the parameter q used for determining the dynamics of the potential risk areas 28 is obtained, based on the parameter q used for determining the dynamics of the potential risk areas 28 that was acquired as prior knowledge information and the result of gathering the state quantities of the potential risk areas obtained from the plural moving bodies 10.

At step 331, the number of instances Tf advancing forward from the current time t at unit time intervals is set, and processing transitions to step 332.

At step 332, change in the state quantities of the potential risk areas 28 is predicted based on the formula of Equation 5, and prediction of the state quantities of the potential risk areas 28 is repeated to predict state quantities x' of the potential risk areas 28 for the number of instances Tf, and the routine is ended.

Figure 10B:
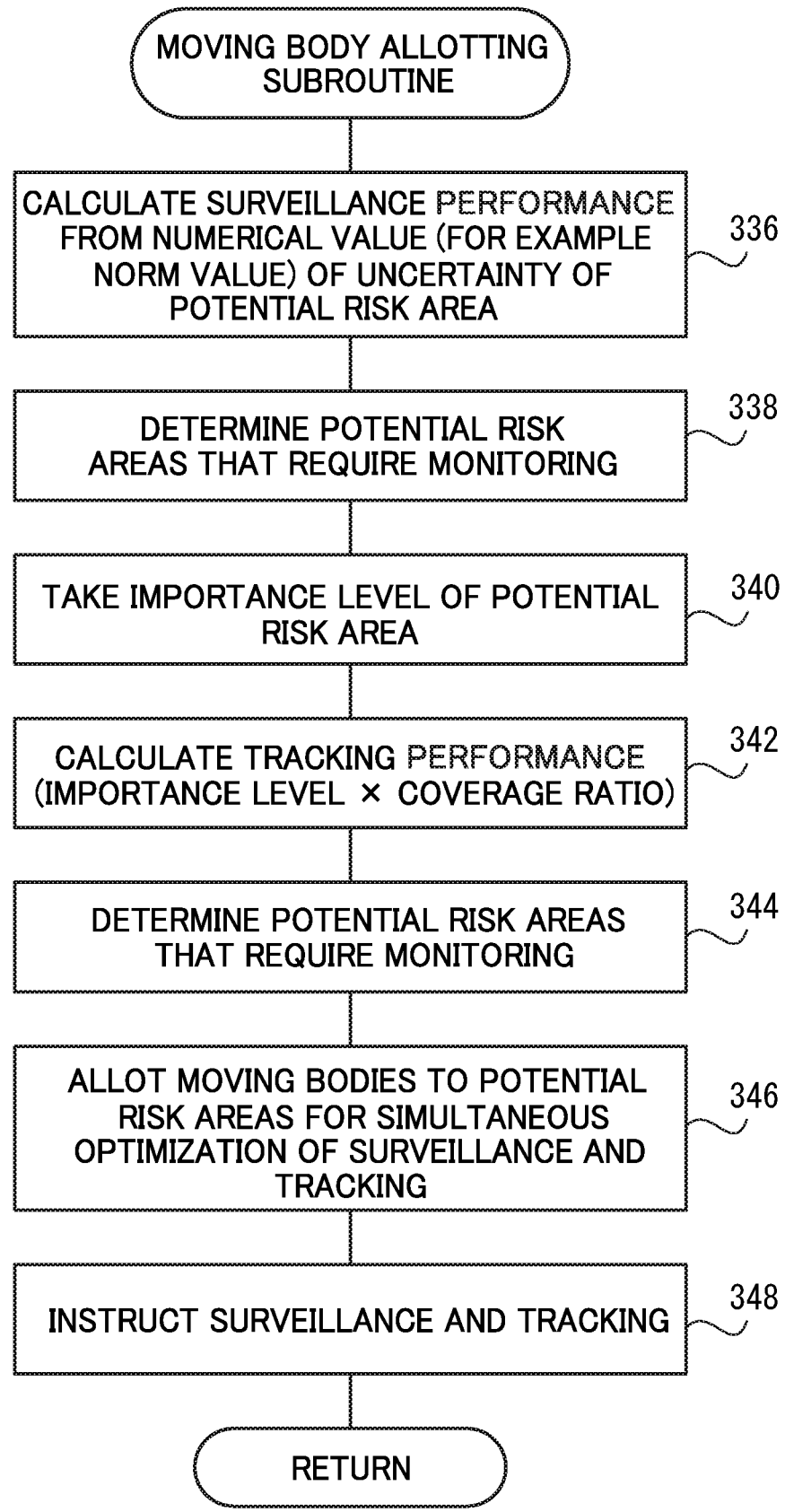
FIG. 10B is a flowchart of control illustrating a moving body allotting subroutine to elaborate on the processing of step 308 in FIG. 8.

FIG. 10B is a flowchart of control illustrating a moving body allotting subroutine to illustrate the processing of step 308 in FIG. 8 in more detail.

At step 336, a numerical value for the uncertainty of each potential risk area 28 is taken from the prediction result for the state quantities of the potential risk areas 28 to calculate the surveillance performance. For example, if the surveillance performances are expressed by norm values of a vector expressing the uncertainty of each potential risk area, the surveillance performance becomes greater the greater the uncertainty.

At the next step 338, potential risk areas 28 that require monitoring in order for the surveillance performance computed at step 336 to satisfy a predetermined level are determined.

At the next step 340, an importance level for each potential risk area 28 is taken from the prediction results for the state quantities of the potential risk areas 28, and processing transitions to step 342.

At step 342, the tracking performance are computed. Namely, the tracking performance is expressed by the importance level multiplied by the coverage ratio. At the next step 344, the potential risk areas 28 that require monitoring in order for the tracking performance obtained at step 342 to satisfy a predetermined level are determined, and processing transitions to step 346.

At step 346, the moving bodies 10 are allotted to the potential risk areas 28 so as to perform simultaneous optimization of surveillance and tracking. Processing then transitions to step 348, surveillance and tracking are instructed, and the routine is ended.

FIG. 10C is a flowchart of control illustrating an information provision subroutine to illustrate the processing of step 310 in FIG. 8 in more detail.

At step 350, a judgement is made as to whether or not information has been acquired. In cases in which determination is negative, the routine is ended.

In cases in which determination is affirmative at step 350, processing transitions to step 352, and blind spot coverage information is generated. For example, as information for a vehicle, reproduced spatial data in which no blind spots are present is generated, processing transitions to step 354, and this information is provided to a user. To explain in more detail, a driver who is looking for a space to park their car in a parking lot is provided with a map of the entire parking lot, enabling the driver to move directly to a parking space. Moreover, warning of the presence of pedestrians in the parking lot enables safer driving to be promoted.

Figure 11:
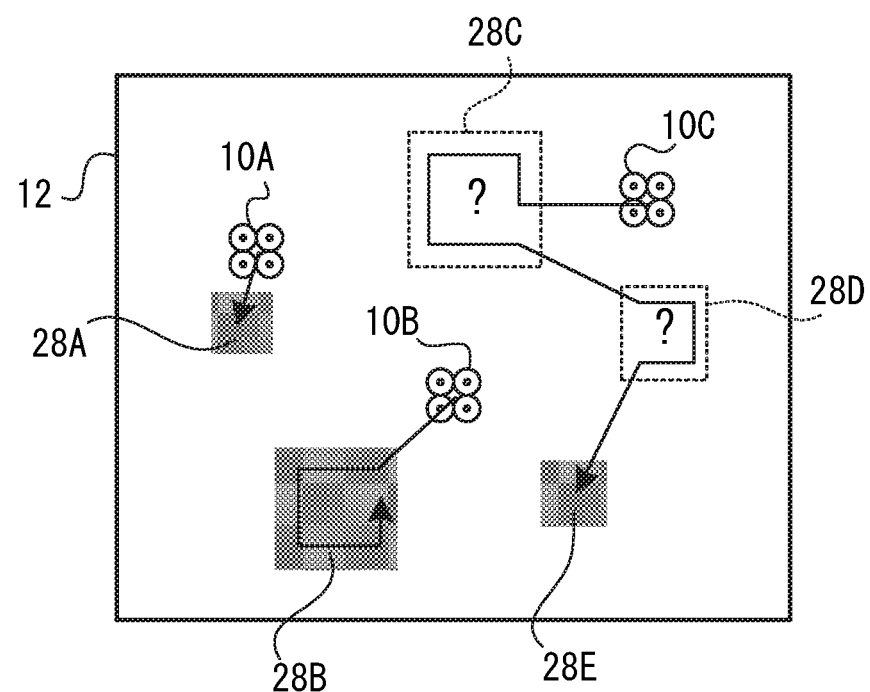
FIG. 11 is a plan view illustrating a situation in an exemplary embodiment in which respective moving bodies are moving around, each of the moving bodies being allotted as either a known potential risk area or a known potential risk area in a specific region.

FIG. 11 is a plan view illustrating a situation in which respective moving bodies 10 are moving around in a particular region 12, each of the moving bodies 10 being allotted to either an unknown potential risk area 28 that requires monitoring in order for the surveillance performance to meet the predetermined level, or a known potential risk area 28 that requires monitoring in order for the tracking performance to meet the predetermined level. Note that in FIG. 11, the suffixes A, B, C are appended in order to distinguish between the individual moving bodies 10, and the suffixes A, B, C, D, E are appended in order to distinguish between the individual potential risk areas 28.

A moving body 10A heads toward a known potential risk area 28A, and is capable of collecting information while attaining a coverage ratio of 1 (100%).

A moving body 10B heads toward a known potential risk area 28B, and in order to raise the coverage ratio, the moving body 10B moves within the range of the potential risk area 28B, enabling the coverage ratio to be raised and information to be collected.

A moving body 10C is initially allotted to an unknown potential risk area 28C, and moves within the range thereof. As a result, the unknown potential risk area 28C becomes a known potential risk area, and the moving body 10C is then allotted to the next unknown potential risk area 28D, and moves in the range thereof. As a result, the unknown potential risk area 28D becomes a known potential risk area, and the moving body 10C is then allotted to a known potential risk area 28E, where it is capable of collecting information while attaining a coverage ratio of 1 (100%).

MODIFIED EXAMPLES OF PRESENT EXEMPLARY EMBODIMENT

In the present exemplary embodiment, out of the plural moving bodies 10 present in each group 52 that monitors a particular region 12, the proportion of moving bodies 10 allotted to unknown potential risk areas 28 that require monitoring in order for the surveillance performance to satisfy the predetermined level, as opposed to moving bodies 10 allotted to known potential risk areas 28 that requires monitoring in order for the tracking performance to satisfy the predetermined level is 1:1 (there is a 50% probability of either). In other words, the moving bodies 10 are allotted to either surveillance or tracking dependent on the result of simultaneous optimization of surveillance and tracking.

Figure 12B:
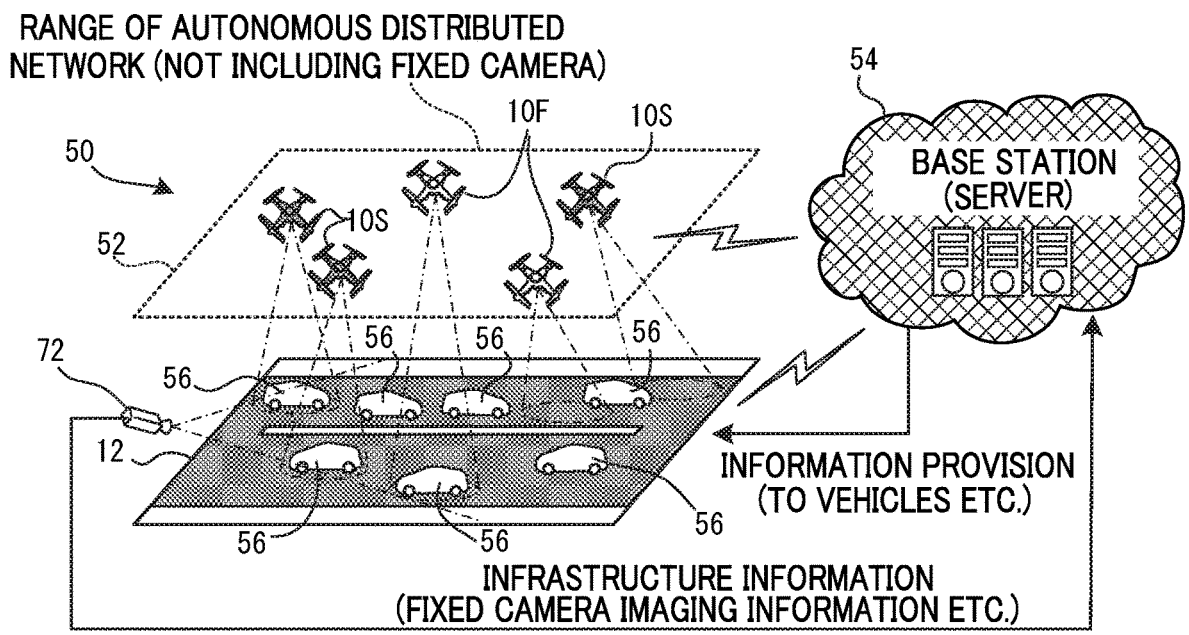
FIG. 12B illustrates a state in which a fixed camera is not incorporated into an autonomous distributed network.

However, in a modified example, the moving bodies may be classified in advance as either a surveillance-only moving body 10 (the shaded moving bodies 10S in FIG. 12), or a tracking-only moving body 10 (the unshaded moving bodies 10F in FIG. 12). Note that although three moving bodies 10S are deployed as a surveillance team and two moving bodies 10F are deployed as a tracking team in FIG. 12, there is no limitation to these numbers and ratio. In addition to the fixed-purpose moving bodies 10S and 10F, moving bodies 10 that are capable of being allotted to either surveillance or tracking, as in the present exemplary embodiment, may also be present.

Moreover, instead of being surveillance-only or tracking-only moving bodies 10, some or all of the moving bodies 10 may be allotted in a ratio favoring one or the other out of surveillance or tracking (for example 8:2, 3:7, etc.).

Note that fixed cameras 72 installed in the regions 12 may configure a networked range in the distributed control system. FIG. 12A is a perspective view in which a fixed camera 72 configures a networked range in the distributed control system, and FIG. 12A is a perspective view in which a fixed camera 72 does not configure a networked range in the distributed control system.

EXAMPLES

Explanation follows regarding examples of application of the moving body distributed control system 50 of the present exemplary embodiment to control movement toward potential risk areas 28 using Voronoi regions.

Example 1

FIG. 13 illustrates moving bodies 10 applied in a moving body distributed control system according to Example 1, and a region 12 in which the moving bodies 10 move.

The region 12 illustrated in FIG. 13 is Voronoi partitioned in the control device 14 of each moving body 10 based on position information from the position recognition module 22.

Voronoi partitioning analyzes the domains of influence of each point (in this case, the positions of the moving bodies 10), and collections of points having the shortest distance to respective moving bodies 10 expressed as single polygons are referred to as Voronoi regions. For example, in FIG. 13, in Voronoi partitioning of a two-dimensional flat plane, boundary lines between the Voronoi partitions are perpendicular bisectors (dashed lines 26 in FIG. 13) of line segments connecting between the moving bodies 10. One of the moving bodies 10 is always present in each Voronoi region (1) to (n) demarcated by the dashed lines 26. Note that the variable n is the number of Voronoi partitions, and n=17 in FIG. 13.

In Example 1, in the range of the region 12, the moving bodies 10 move freely with respect to each other, and each time this occurs, the Voronoi regions change. The Voronoi regions in FIG. 13 corresponding to when each of the moving bodies 10 has moved from the position indicated by dotted lines to the position indicated by solid lines.

Figure 14A:
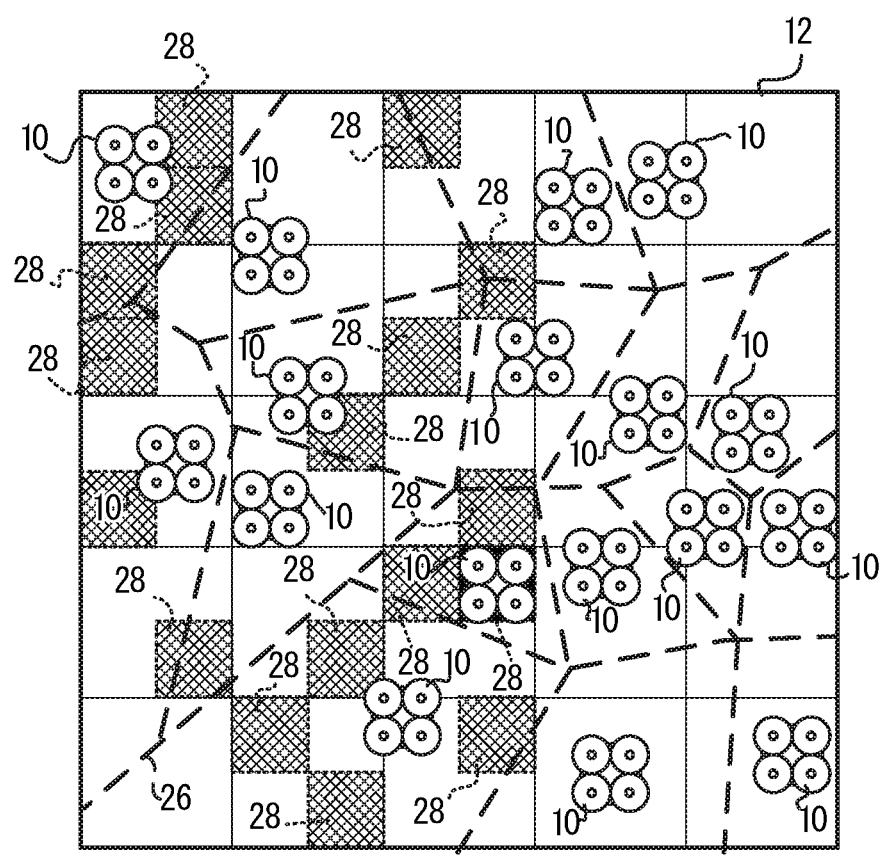
FIG. 14A is a plan view illustrating Voronoi partitioned regions during potential risk area designation according to Example 1 of the exemplary embodiment.

Moreover, in Example 1, in the region 12 illustrated in FIG. 13, monitoring targets (potential risk areas) 28 corresponding to particular surveillance regions and tracking regions in the present exemplary embodiment are designated as illustrated in FIG. 14A.

In Example 1, the area of a single unit of potential risk area 28 is equivalent to the area of a monitoring range which the monitoring module 18 of one moving body 10 is capable of monitoring. Namely, when the center of one moving body 10 overlaps with the center of a potential risk area 28 illustrated by a rectangular hatching pattern then the entire potential risk area 28 is within the monitoring range.

Note that the area of each of the potential risk areas 28 and the area of the monitoring range need not necessarily have a 1:1 relationship.

The positions of each moving body 10 in FIG. 14A are the same as the positions illustrated in FIG. 13. Each moving body 10 moves toward a potential risk area 28 in its own Voronoi region while the moving bodies 10 exchange position information with each other.

Figure 14B:
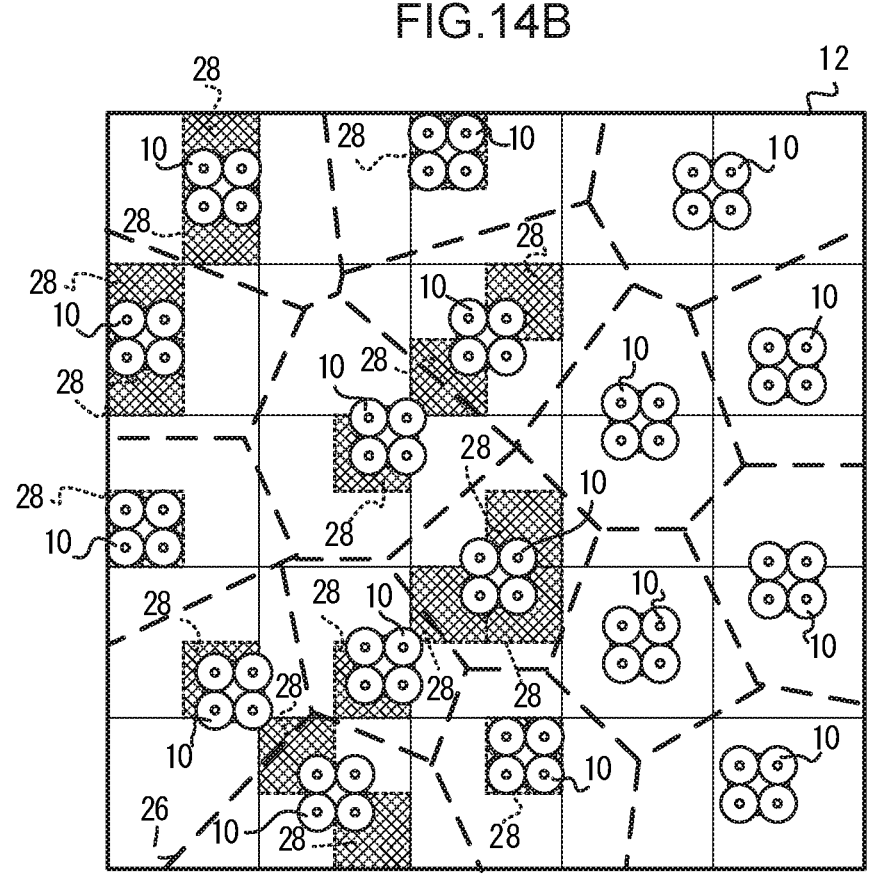
FIG. 14B illustrates moving bodies after moving based on control rule 1.

FIG. 14B illustrates the result when the moving bodies 10 have moved from FIG. 14A under control of related technology that moves the moving bodies 10 toward the potential risk areas 28 while maintaining the Voronoi regions (control rule 1).

Here, under control rule 1, a situation arises in which it is not possible to make all of the potential risk areas 28 fall into the monitoring ranges of the moving bodies 10.

Namely, the level of monitoring of the designated potential risk areas 28 can be expressed in terms of a coverage ratio. The coverage ratio is the area of monitoring regions of the moving bodies 10 divided by the area of the potential risk areas 28. Note that this may be expressed as a percentage ((area of monitoring regions of the moving bodies 10/area of the potential risk areas 28)×100%).

Based on control rule 1, it is apparent that in FIG. 14B there are potential risk areas 28 present for which the coverage ratio is less than 1 (less than 100%). On the other hand, the moving bodies 10 fulfil no function whatsoever when in a Voronoi region in which there is no potential risk area 28 present.

Namely, even if the combined area of the monitoring regions of all of the moving bodies 10 is greater than the total area of the designated potential risk areas 28, it is not possible to monitor all of the potential risk areas 28 when control is constrained by the control rule 1.

Accordingly, in the present exemplary embodiment, in addition to control rule 1, control (control rule 2) is also established to move a moving body 10 so as to leave its own Voronoi region and move toward a potential risk area 28 where the insufficient coverage ratio is insufficient (0<coverage ratio<1) based on positional relationships between (the monitoring ranges of) the moving bodies 10 and the potential risk areas 28.

FIG. 15A to FIG. 15E illustrate conceivable situations of positional relationships between (the monitoring ranges of) moving bodies 10 and potential risk areas 28.

Figure 15A:
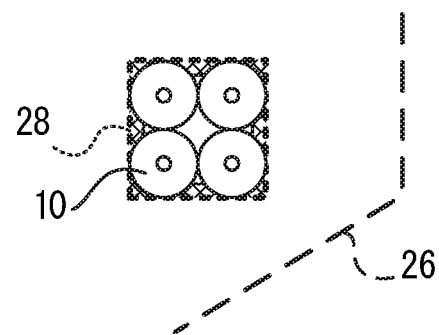
FIG. 15A is a plan view illustrating a correlative relationship between a moving body and a potential risk area according to Example 1 of the exemplary embodiment in a case in which a coverage ratio=1.

FIG. 15A illustrates a situation in which within a single Voronoi region a single moving body 10 is addressing a single potential risk area 28 unit. The area of the monitoring range of the single moving body 10 matches the area of the potential risk area 28, such that the coverage ratio is 1. This is an ideal relationship.

Figure 15B:
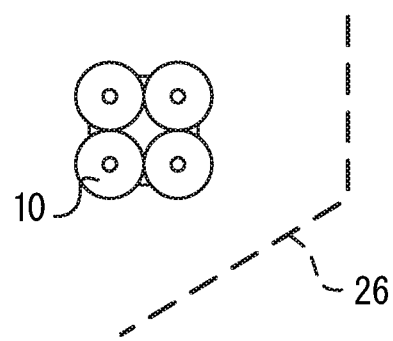
FIG. 15B illustrates a case in which there is no coverage.

FIG. 15B illustrates a case in which no potential risk area 28 is present in the Voronoi region under the responsibility of a moving body 10. This is the most inefficient relationship (Situation 1).

Figure 15C:
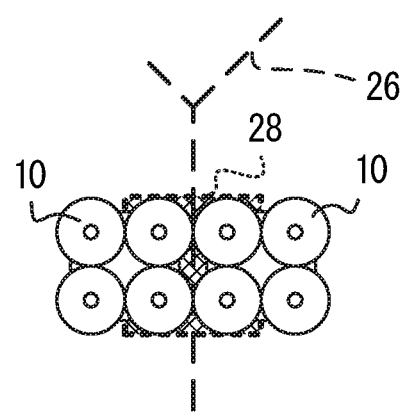
FIG. 15C illustrates a case in which the coverage ratio is less than 1.

FIG. 15C illustrates a case in which a single designated potential risk area 28 unit straddling two Voronoi regions is being addressed by the two moving bodies 10 responsible for the respective Voronoi regions. The area of the monitoring ranges of the two moving bodies 10 is greater than the area of the potential risk area 28, such that the coverage ratio is greater than 1 (i.e. 2 (=200%)), thus giving a relationship in which there is an excess in the monitoring ranges of the moving bodies 10 (Situation 2).

Figure 15D:
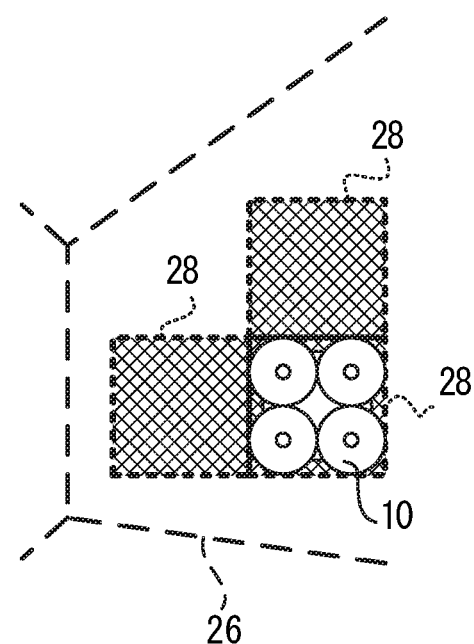
FIG. 15D illustrates a case in which the coverage ratio is greater than 0 but less than 1.

On the other hand, FIG. 15D illustrates a situation in which three potential risk area 28 units within a single Voronoi region are being addressed by a single moving body 10. The coverage ratio is less than 1 (0.333 . . . ). This is a relationship in which the potential risk areas 28 are insufficiently monitored.

In the relationship in FIG. 15A, the moving body 10 is preferably maintained in its current state.

The relationship in FIG. 15B (Situation 1) is a situation in which the monitoring range of one moving body 10 is going to waste. In other words, this is a situation in which the moving body 10 illustrated in FIG. 15B could be allocated to another potential risk area 28.

The relationship in FIG. 15C (Situation 2) is a situation in which half of the monitoring range of each of the two moving bodies 10 is going to waste. In other words, this is a situation in which were it not for the constraint of the Voronoi regions, one of the moving bodies 10 out of the two moving bodies 10 in FIG. 15C could be allocated to another potential risk area 28.

On the other hand, the relationship in FIG. 15D is a situation in which two of the potential risk area 28 units cannot be monitored.

Figure 15E:
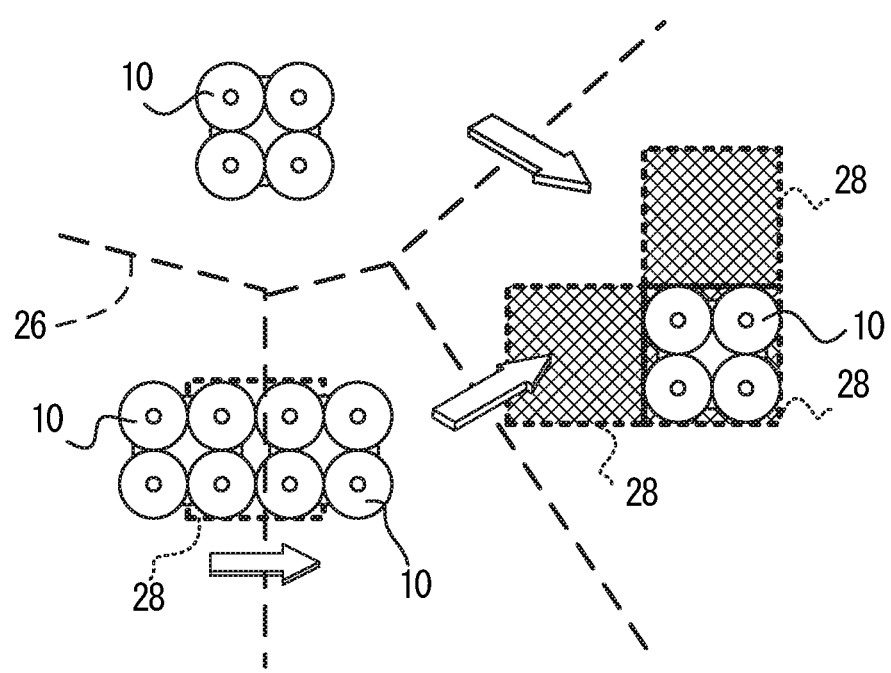
FIG. 15E illustrates moving bodies capable of moving beyond a Voronoi region within a region.

The present exemplary embodiment acknowledges the situations in FIG. 15B and FIG. 15C (Situation 1 and Situation 2 in which there is excess of monitoring range of the moving bodies), and the situation in FIG. 15D (a situation in which the monitoring range of the moving bodies 10 is insufficient), and so deviates from Voronoi region maintenance control (control rule 1) to set the control rule 2 permitting the moving bodies 10 to be moved (see FIG. 15E).

Moreover, in the present exemplary embodiment, in cases in which the importance levels of the potential risk areas 28 differ, movement of the moving bodies 10 is controlled according to the importance level.

Figure 16A:
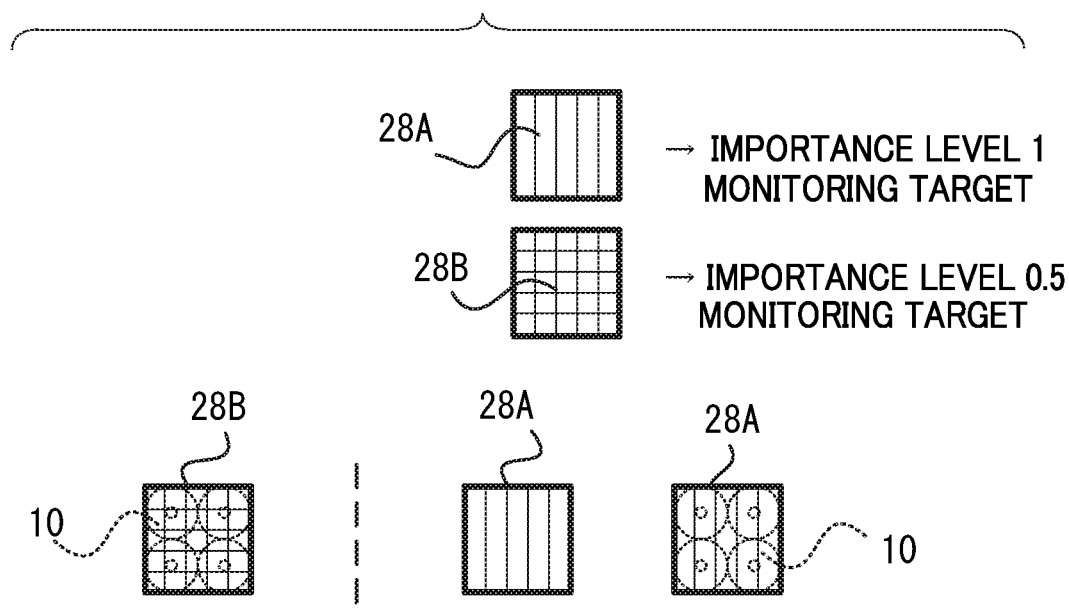
FIG. 16A is a coverage transition diagram illustrating change in coverage ratio according to a priority level when potential risk areas are set with an importance level.
Figure 16B:
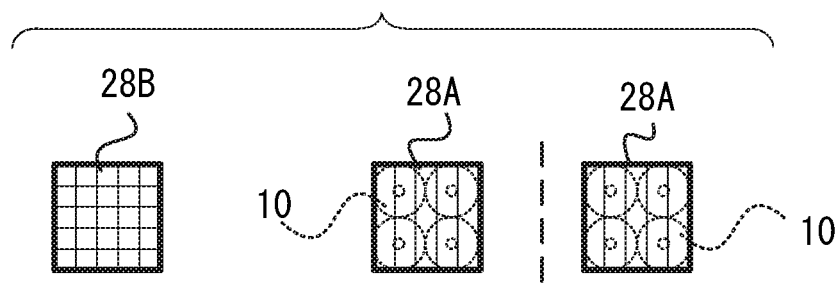
FIG. 16B is a coverage transition diagram illustrating change in coverage ratio according to a priority level when potential risk area are set with an importance level.

FIG. 16A and FIG. 16B illustrate movement control of the moving bodies 10 based on the importance levels.

The importance levels are, for example, expressed by numerical values greater than 0 and up to and including 1, with 1 being the highest importance level. FIG. 16A and FIG. 16B envisage the presence of potential risk areas 28A with an importance level of 1 and potential risk areas 28B with an importance level of 0.5.

For example, as illustrated in FIG. 16A, a potential risk area 28B with an importance level of 0.5 is present in a first block. When this is covered (monitored) by a moving body 10 then, from the perspective of the importance level, since only 50% of the monitoring area capability of the moving body is being used, the coverage ratio is 1/0.5=2. Moreover, two potential risk areas 28A with an importance level of 1 are present in a second block. When one of these potential risk areas 28A is covered (monitored) by a moving body 10, from the perspective of the importance level, 100% of the monitoring area capability of the moving body 10 is being used, such that the coverage ratio is 1/(1+1)=0.5.

Here, an overall evaluation of the coverage ratio taking into account the importance level is expressed as an evaluation index. The higher the numerical value of the evaluation index, the better the coverage ratio.

In FIG. 16A, the evaluation index for the two blocks would be 0.5+1=1.5.

In contrast thereto, in a case in which a potential risk area 28B with an importance level of 0.5 and a potential risk area 28A with an importance level of 1 are present in the first block, as illustrated in FIG. 16B, if the potential risk area 28A is covered (monitored) by the moving body 10 then the coverage ratio would be 1/(0.5+1)=0.67. Moreover, if a potential risk area 28A with an importance level of 1 were present in the second region and covered (monitored) by the moving body 10 then the coverage ratio would be 1/1=1.

In FIG. 16B, the evaluation index for the two blocks would be 1+1=2.

Namely, the overall coverage ratio can be improved by prioritizing coverage of the potential risk areas 28 with a high importance level.

In the moving body 10 movement control performed under control rule 2 the following conditions are set, and the moving body 10 which is to be moved is selected by mediation between the moving bodies 10.

Condition 1

There must be no other moving body 10 present on a movement path of a moving body 10 moving to a potential risk area 28 having an insufficient monitoring range (defined as "positive").

Condition 2

A moving body 10 meeting Condition 1 must declare its movement to other moving bodies 10.

Declaring movement is made by overwriting a potential risk area 28 that was defined as being "positive" to "negative". Moreover, the movement path is also overwritten as "negative". Accordingly, movement is only permitted for the moving body 10 that declared movement first, enabling a situation in which plural of the moving bodies 10 head toward a single potential risk area 28, resulting in collisions or the like, to be avoided.

Figure 17:
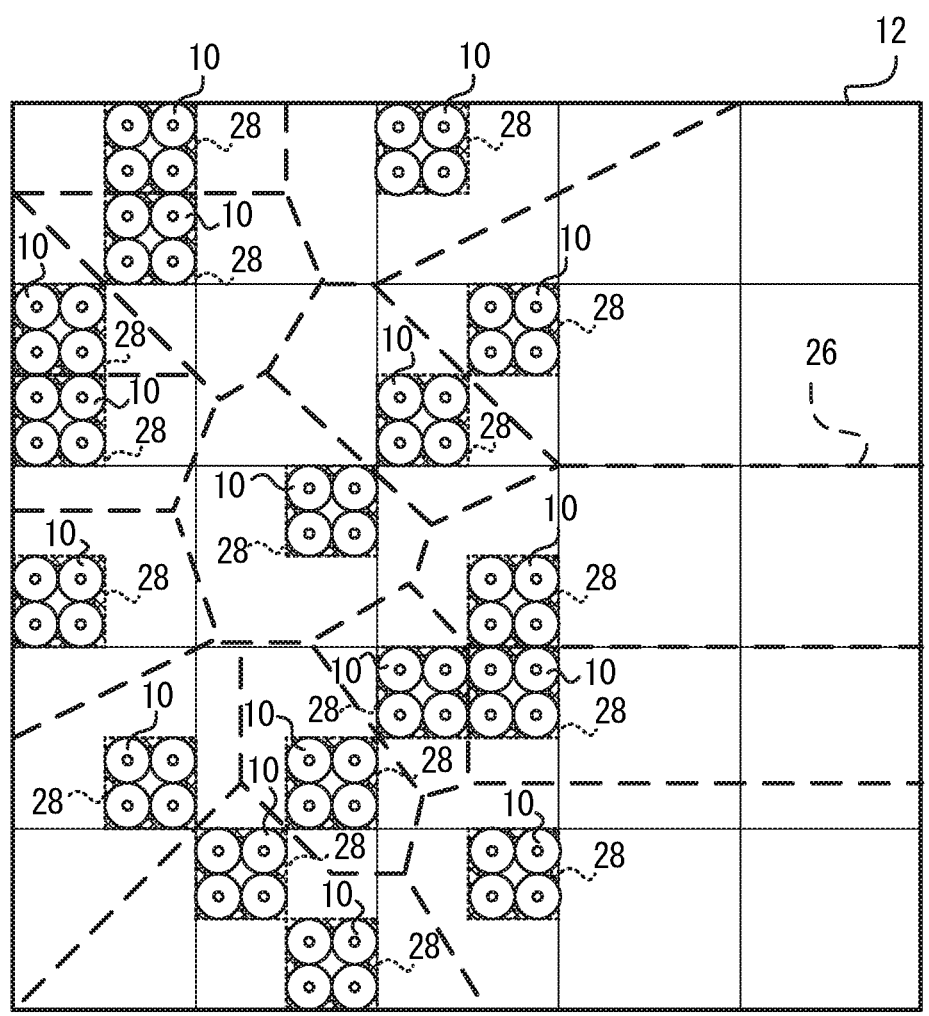
FIG. 17 is a plan view of Voronoi partitioned regions according to Example 1 of the exemplary embodiment, illustrating moving bodies after moving from the state in FIG. 14B based on control rule 2.

FIG. 17 illustrates the result after the moving bodies 10 have moved from the state in FIG. 14B under control of control rule 2. It is apparent that a 1:1 relationship is achieved between all of the potential risk areas 28 and the monitoring ranges of the moving bodies 10.

Explanation follows regarding operation of Example 1, with reference to the flowchart of FIG. 18. Note that in this flowchart, it is assumed that the potential risk areas 28 have been set to surveillance regions and tracking regions identified by the prediction control of the present exemplary embodiment.

FIG. 18 is a flowchart illustrating a potential risk area monitoring control routine according to the present exemplary embodiment, and mainly illustrates a dedicated flow of movement control of the moving bodies 10.

At step 100, a moving body 10 collects information relating to itself. Namely, the moving body 10 recognizes its own position information in the region 12 (see FIG. 13), and transmits this position information to the other moving bodies 10. The information relating to the moving body 10 itself may also be transmitted to the base station.

At the next step 102, the moving body 10 collects information relating to the other moving bodies 10 (moving bodies 10 present in the region 12 other than itself). Namely, the moving body 10 recognizes position information of the other devices, and processing transitions to step 104. The information relating to the other moving bodies 10 may also be collected from the base station.

At step 104, input calculation is executed under control rule 1. Namely, Voronoi regions are successively set for each of the moving bodies 10, and in cases in which there is a potential risk area 28 present in a Voronoi region, movement control is executed so as to cover the potential risk area 28.

At the next step 106, the moving body 10 ascertains its own current state. Namely, the moving body 10 makes a judgement as to whether it is in a situation in which there is no potential risk area 28 present in its own moving body Voronoi region (Situation 1), or it is in a situation in which there is a potential risk area 28 in its own moving body Voronoi region that is smaller than the monitoring area of the moving body (the coverage ratio is greater than 1) (Situation 2), or it is in another situation.

In cases in which determination is affirmative at step 106, namely in cases in which a judgement is made that either Situation 1 or Situation 2 exists, processing transitions to step 108, and input calculation is executed following control rule 2. Namely, mediation is performed regarding which moving body 10 is to move outside its own Voronoi region and toward a potential risk area 28 having a coverage ratio of less than 1 (coverage ratio<1), then control is executed to move the moving body 10 determined by the mediation so as to leave its own Voronoi region and move toward the potential risk area 28, and processing transitions to step 110.

In cases in which determination is negative at step 106, processing transitions to step 110.

At step 110, a judgement is made as to whether or not coverage of all of the potential risk areas 28 has been achieved. In cases in which determination is affirmative, the current routine is ended. In cases in which determination is negative at step 110, processing returns to step 100, and the above process is repeated.

Note that in cases in which the total area of the potential risk areas 28 is greater than the total area capable of being monitored by the plural moving bodies 10, the moving bodies 10 may tasked to address plural potential risk areas 28 over a time series so as to obtain information about the potential risk areas 28.

With the aim of avoiding collisions as the plural moving bodies 10 move freely in the region 12, Example 1 enables the coverage ratio of the potential risk areas 28 to be improved by, as control rule 2, mediating movement to potential risk areas 28 with low coverage ratios (for example on a first-come-first-served basis) and moving the moving bodies 10 so as to leave their current Voronoi regions when there is a need to correct a reduction in coverage ratio of the potential risk areas 28 caused as a result of setting the Voronoi regions based on control rule 1.

Operation and Advantageous Effects of Example 1

Example 1 applies distributed management technology that defines Voronoi regions as technology for controlling plural moving bodies without resorting to centralized management.

For example, in cases in which plural moving bodies are moved to potential risk areas 28 set within a predetermined region so as to monitor the potential risk areas 28, partitioning the predetermined region into Voronoi regions and setting each partitioned region as a region of responsibility for the respective moving body enables collisions between the moving bodies to be avoided.

Technology to define Voronoi regions is capable of providing logic ideally suited to cases in which plural moving bodies are envisaged. Moreover, there is no need to implement a detailed action plan for each of the moving bodies, and the respective moving bodies are capable of autonomous, distributed decision making while communicating with their surroundings.

However, conventional autonomous distributed control in which Voronoi regions are defined works well as long as the region of responsibility of each single moving body contains potential risk areas 28 capable of being addressed by that moving body. In reality, however, it may be envisaged that situations such as the following might occur on a constant basis.

Situation 1

No potential risk area 28 is present in a region of responsibility, with the result that a moving body does not fulfil a monitoring function (what is referred to as an idle moving body is present). An example thereof is a case in which the surveillance performance according to the uncertainty of each potential risk area 28 in the region of responsibility of a moving body and the tracking performance according to the importance level of each potential risk area 28 in the region of responsibility are each at a predetermined level.

Situation 2

In cases in which there is a potential risk area 28 present that could be monitored by a single moving body straddling two or more regions of responsibility, monitoring is performed by the moving bodies in their respective regions of responsibility, such that two or more moving bodies monitor the potential risk area with excess capability.

Situation 3

A potential risk area for which monitoring by a single moving body would be insufficient is present in a single region of responsibility.

Example 1 enables an improvement in the coverage ratio, this being a ratio of the monitoring regions capable of being monitored by the moving bodies to the potential risk areas 28, under autonomous distributed control.

Example 2

Figure 19A:
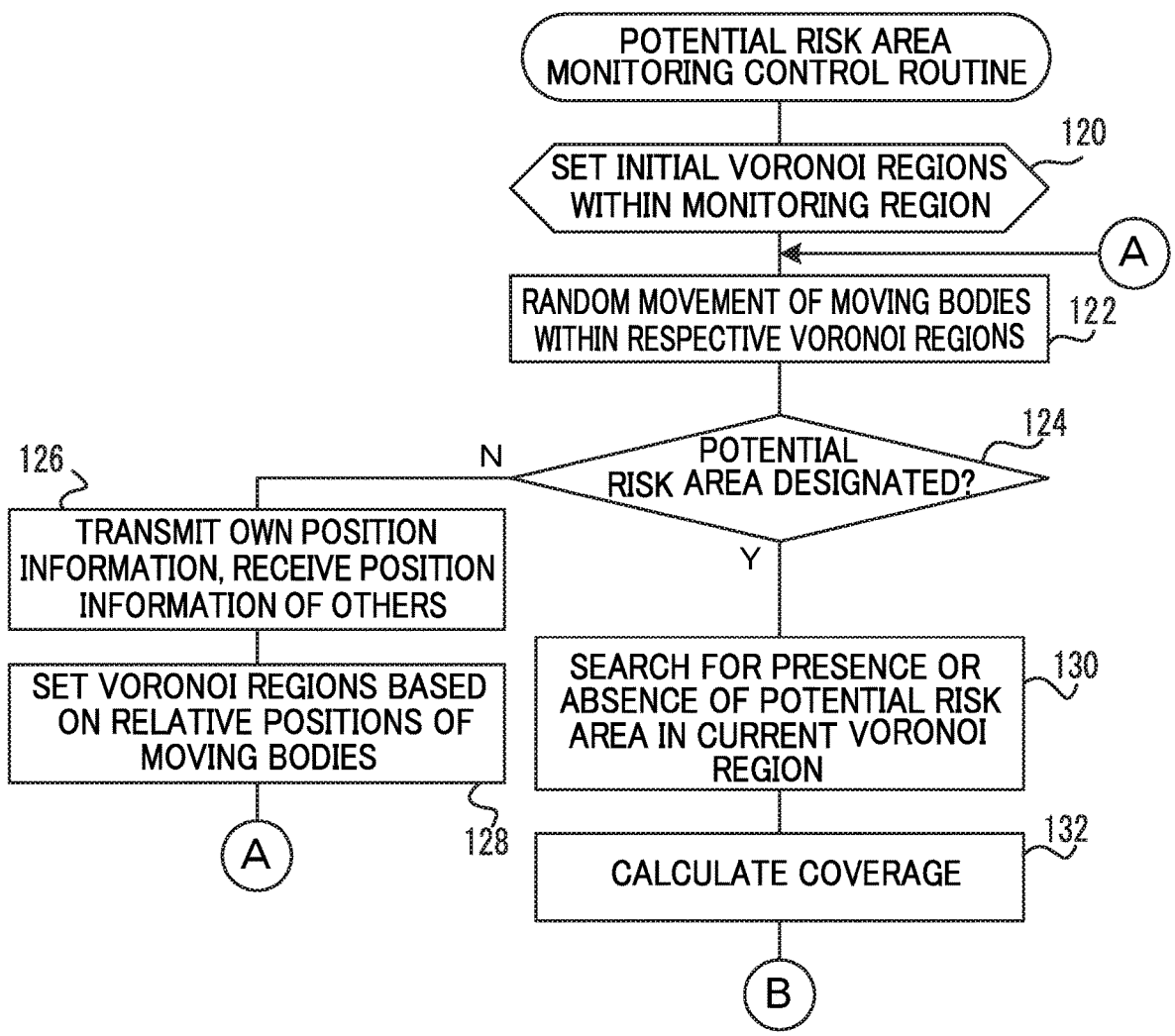
FIG. 19A is a flowchart illustrating a potential risk area monitoring control routine according to Example 2 of the exemplary embodiment, in which the moving body to move to an objective potential risk area is decided on a first-come-first-served basis.
Figure 19B:
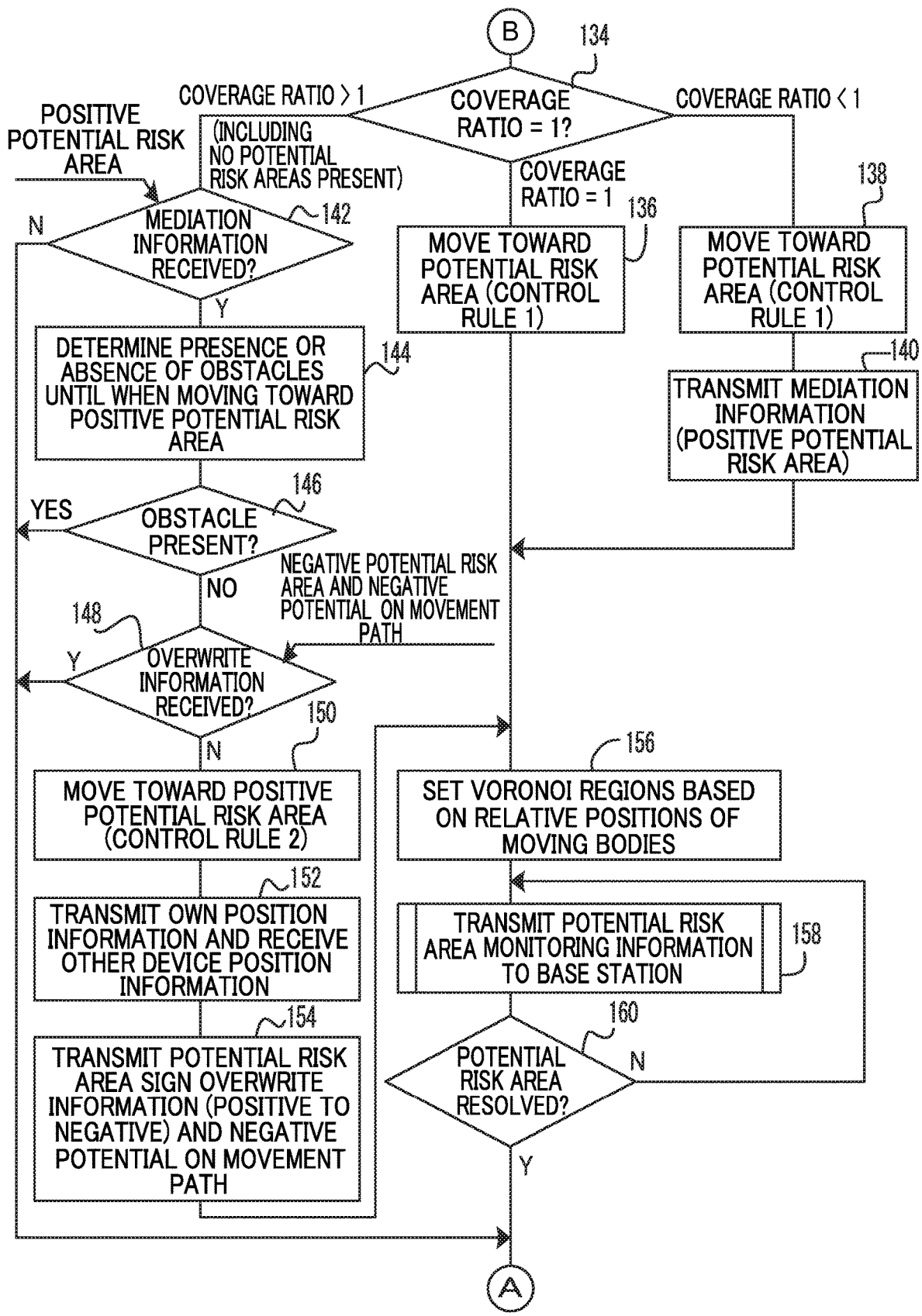
FIG. 19B is a flowchart illustrating a potential risk area monitoring control routine according to Example 2 of the exemplary embodiment, in which the moving body to move to an objective potential risk area is decided on a first-come-first-served basis.

In the present exemplary embodiment, when potential risk area monitoring control is executed based on the flowchart of FIG. 18, there is a need for mediation in order to avoid interference (collisions) between the moving bodies 10 moving toward potential risk areas 28, in particular in the case of control rule 2. FIG. 19A and FIG. 19B are flowcharts illustrating a potential risk area monitoring control routine as Example 2 (Example 2 being embellished from Example 1) in which the moving body 10 to be moved toward an objective potential risk area 28 is decided based on the principle of first-come-first-served.

As illustrated in FIG. 19A, at step 120, initial Voronoi regions are set in the region 12 as illustrated in FIG. 13. Next, processing transitions to step 122 and the moving bodies 10 are moved randomly within their respective Voronoi regions. Processing then transitions to step 124.

At step 124, a judgement is made as to whether or not potential risk areas 28 have been designated. In cases in which determination is negative, processing transitions to step 126, and each moving body 10 transmits its own position information and receives position information of other moving bodies 10. Next, processing transitions to step 128 and Voronoi regions are set based on the relative positions of the moving bodies 10. Processing then returns to step 120.

Moreover, in cases in which determination is affirmative at step 124, processing transitions to step 130, and the presence or absence of a potential risk area 28 in the current Voronoi region is searched for. Next, processing transitions to step 132, the coverage ratio is calculated, and processing transitions to step 134 of FIG. 19B.

At step 134, processing branches depending on the calculated coverage ratio.

Namely, in cases in which a judgement has been made at step 134 that the coverage ratio=1, there is a 1:1 relationship between the area of the potential risk area 28 and the area of the monitoring range of the moving body 10. Determination is thus made that monitoring of the potential risk area 28 is possible under control by control rule 1, processing transitions to step 136, and the moving body 10 is moved to the potential risk area 28 based on control rule 1. Processing then transitions to step 156. In such cases, the moving body 10 is capable of covering all of the potential risk areas 28 inside its own Voronoi region (region of responsibility) (see the state in FIG. 15A).

Moreover, in cases in which determination has been made at step 134 that the coverage ratio<1, processing transitions to step 138, and the moving body 10 is moved to a potential risk area 28 inside its own Voronoi region based on control rule 1. Processing then transitions to step 140, and mediation information (regarding a positive potential risk area indicating that the potential risk areas 28 cannot be fully covered) is transmitted, before processing transitions to step 156. In such cases, the moving body 10 is capable of at least partially covering of the potential risk areas 28 in its own Voronoi region (region of responsibility) (see the state in FIG. 15D).

On the other hand, in cases in which determination is made at step 134 that the coverage ratio>1 (including cases in which there is no potential risk area 28 present), a judgement is made that a potential risk area 28 present in a Voronoi region of another device could be covered (see the states in FIG. 15B and FIG. 15C). Processing transitions to step 142, and a judgement is made as to whether or not mediation information (a positive potential risk area) has been received.

In cases in which determination is negative at step 142, processing returns to step 120. In cases in which determination is affirmative at step 142, processing transitions to step 144, and a judgement is made as to whether or not an obstacle would be present when moving toward the positive potential risk area. Processing transitions to the next step 146, and a judgement is made as to whether or not an obstacle is present. In cases in which a judgement is made at step 146 that an "obstacle is present", processing returns to step 120. In cases in which a judgement is made at step 146 that "no obstacle is present", processing transitions to step 148, a judgement is made as to whether or not overwrite information (a negative potential risk area and a negative potential for a movement path, indicating that the potential risk area 28 is being covered) has been received. In cases in which determination is negative at step 148, processing transitions to step 150. At this point in time, the exclusive right to move to the potential risk area 28 is attained (on the principle of first-come-first-served). In cases in which determination is affirmative at step 148, a judgement is made that the exclusive right has not been attained, and processing returns to step 120.

At step 150, the moving body 10 is moved toward the potential risk area based on control rule 2, and processing transitions to the next step 152 where the moving body 10 transmits its own position information and receives position information of the other devices. Then, processing transitions to step 154, and, in order to declare that it has attained the exclusive right, the moving body 10 transmits overwrite information to overwrite the mediation information (changing the positive potential risk area to a negative potential risk area) and transmits negative potential information for the movement path, before processing transitions to step 156.

At step 156, Voronoi regions are set based on the relative positions of the moving bodies 10. Processing then transitions to step 158, and potential risk area 28 monitoring information (for example imaging information) is transmitted to the base station. Processing then transitions to step 160. At step 160, a judgement is made as to whether or not the potential risk area 28 has been resolved. In cases in which determination is negative, processing returns to step 158. In cases in which determination is affirmative at step 160, processing returns to step 120.

Example 3

Figure 20:
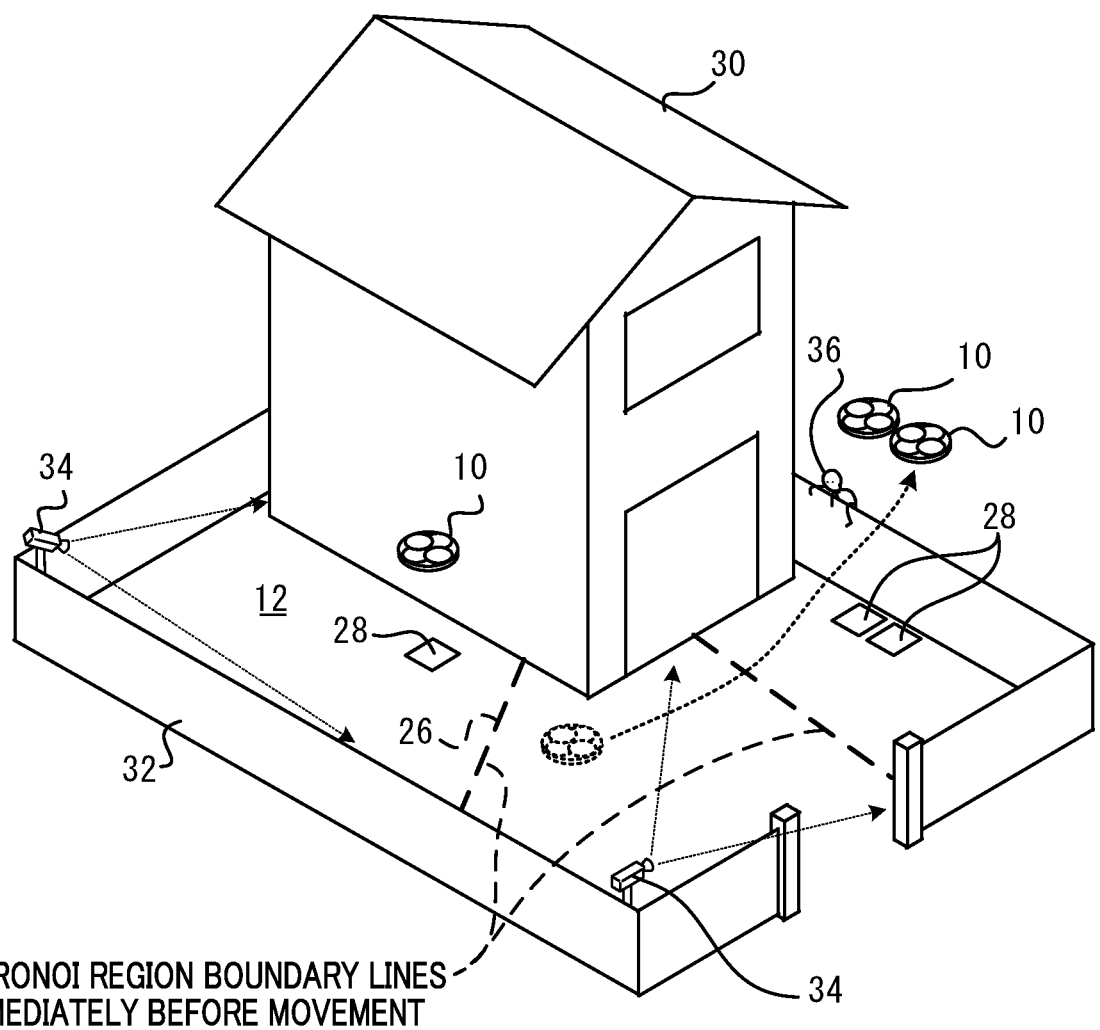
FIG. 20 illustrates an example according to Example 3 of the exemplary embodiment, in which a moving body distributed control system is applied to monitoring by a home security system.

FIG. 20 illustrates an Example 3, this being an example in which the moving body 10 distributed control system is employed in the monitoring of a home security system.

As illustrated in FIG. 20, a wall 32 is provided around the periphery of a house 30, and a site enclosed by the wall 32 is monitored by fixed monitoring cameras 34. Three of the moving bodies 10 are deployed within the site, the site is Voronoi partitioned, and the moving bodies 10 move while avoiding collisions with each other.

For example, in cases in which the presence of a suspicious person 36 has been detected by the fixed monitoring cameras 34, potential risk areas 28 are set in order to focus monitoring on the region where the suspicious person 36 was detected. When this is performed, although the potential risk areas 28 are not able to be sufficiently covered by a single moving body 10 in cases in which there are Voronoi regions present, the three moving bodies 10 can be moved to the potential risk areas 28 based on control rule 2.

Note that in cases in which there is a blind spot present on the site, monitoring may be focused on the blind spot. Moreover, although in the monitoring example of Example 3 it is a site around the house 30 that is monitored, a site employed as a parking lot may be monitored. In the case of a parking lot, blind spots for fixed monitoring cameras change depending on the number and positions of parked vehicles, and therefore monitoring using the moving bodies 10 is effective.

Example 4

Figure 21A:
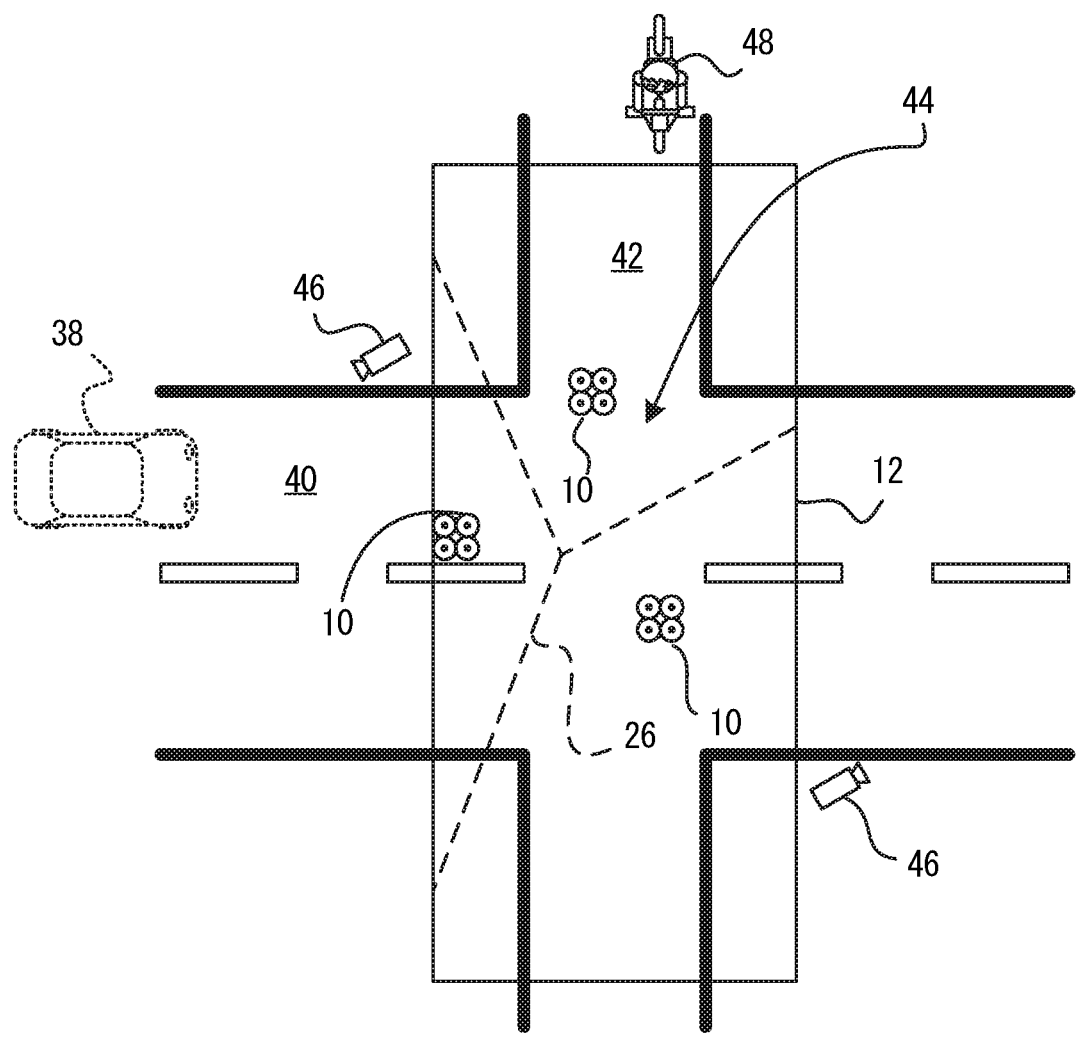
FIG. 21A illustrates an example according to Example 4 of the exemplary embodiment, in which a moving body distributed control system is applied to monitoring of a crossroad for accident prevention.
Figure 21B:
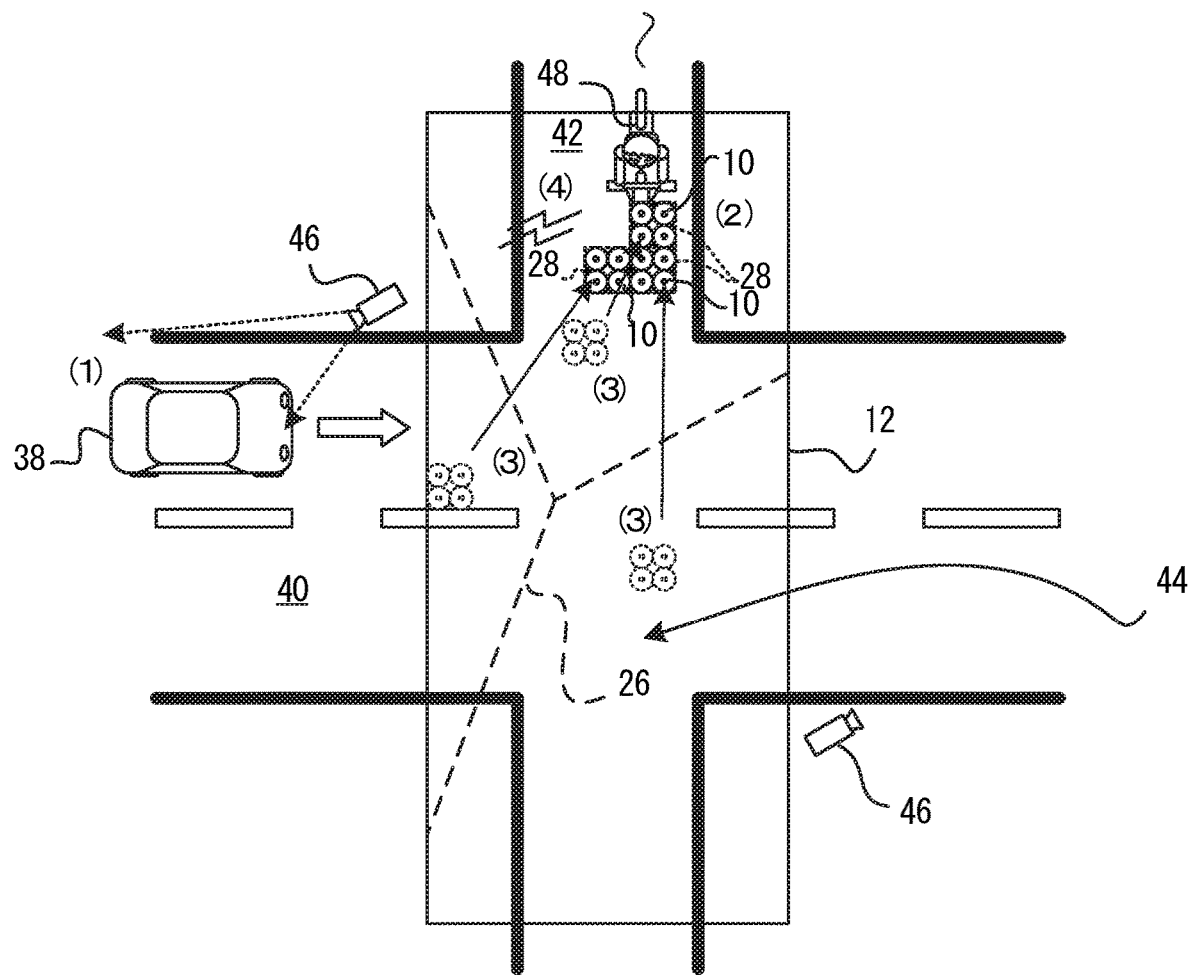
FIG. 21B is illustrates an example according to Example 4 of the exemplary embodiment, in which a moving body distributed control system is applied to monitoring of a crossroad for accident prevention.

FIG. 21A and FIG. 21B illustrate an Example 4, this being an example in which the moving body 10 distributed control system is employed for monitoring at a crossroad in order to prevent accidents.

As illustrated in FIG. 21A, at a crossroad 44 where a side-road 42 intersects a main road 40 on which vehicles 38 can travel, monitoring cameras 46 are installed on the main road 40 to monitor the approach of vehicles 38. Three moving bodies 10 are deployed in a preset region 12 at the crossroad 44. The site is Voronoi partitioned and the moving bodies 10 move while avoiding collisions with each other.

For example, as illustrated in FIG. 21B, in cases in which the approach of a vehicle 38 has been detected by a monitoring camera 46, a prediction is made that a bicycle 48 or the like might suddenly emerge from the side-road 42 onto the main road 40 at the side the vehicle 56 is travelling on (from the side-road 42 on the upper side in FIG. 21B), and potential risk areas 28 are set in order to focus monitoring on a region including the side-road 42. When this is performed, although the potential risk areas 28 are not able to be sufficiently covered by a single moving body 10 in cases in which there are Voronoi regions present, the three moving bodies 10 can be moved to the potential risk areas 28 based on control rule 2.

Image information imaged by the moving bodies 10 is transmitted to the vehicle 38 to enable the driver to recognize the danger in advance.

Although examples have been given of monitoring of the property of the house 30 as illustrated in FIG. 20, and of monitoring to recognize danger at the crossroad 44 in advance as illustrated in FIG. 21A and FIG. 21B, other examples include applications executed by plural moving bodies 10 that normally monitor a wide monitoring range, such as a mountain or an office building, to identify people in need of rescue in disaster situations by designating potential risk areas in regions smaller than the usual range in order to carry out focused search and rescue operations.

Example 5

In FIG. 17, it is assumed that the positions of the potential risk areas 28 do not change (do not move) prior to the moving bodies 10 moving (see FIG. 14B). Hereafter, potential risk areas 28 that do not move are referred to as static potential risk areas 28.

However, the potential risk areas 28 may move. For example, in cases in which a potential risk area 28 corresponds to a person, motorcycle, vehicle, or the like, the position of the potential risk area 28 will change from moment to moment at its own movement speed. Such potential risk areas 28 that are capable of movement are defined as "dynamic potential risk areas 28", in contrast to the static potential risk areas 28. Note that in the present exemplary embodiment, the static potential risk areas 28 and the dynamic potential risk areas 28 are allocated the same reference numerals from the perspective that they are both potential risk areas 28, and are distinguished using the words "static" and "dynamic" where necessary.

Dynamic potential risk areas 28 can be classified into the following two types.

Classification 1

Dynamic potential risk areas 28 that have a slower maximum speed than the movement speed of the moving bodies 10.

Classification 2

Dynamic potential risk areas 28 that have a faster maximum speed than the movement speed of the moving bodies 10.

In the case of classification 1, a moving body 10 is capable of maintaining constant tracking of the dynamic potential risk area 28 when the dynamic potential risk area 28 is moving in a straight line.

However, in the case of classification 2, a situation in which the moving body 10 is unable to track the dynamic potential risk area 28 could arise when the dynamic potential risk area 28 is moving in a straight line.

In Example 5, in addition to the control rule 1 and the control rule 2 described above, a classification 1 situation and a classification 2 situation are distinguished. Movement control of the moving bodies 10 is configured by executing a control rule 3 for tracking control in the case of the classification 1, and executing a control rule 4 for tracking control in the case of the classification 2.

The control rule 3 or the control rule 4 needs to be selected during the processing of either the control rule 1 or the control rule 2 described above.

Accordingly, in the present exemplary embodiment, during potential risk area monitoring control (explained in detail in FIG. 18), processing of the input calculation for movement control under control rule 1 or the input calculation for movement control under control rule 2 is assumed to have taken place when selection control (explained in detail in FIG. 22) is executed in order to perform tracking.

Execution of the control rule 3 or the control rule 4 is selected based on the result of comparing a movement speed v1 (maximum speed) of the moving body 10 itself against a movement speed v2 (maximum speed) of a dynamic potential risk area 28 configuring a tracking target (v1:v2).

In cases in which the movement speed of the moving body 10 is determined to be the same as the movement speed of the dynamic potential risk area 28 or faster than the movement speed of the dynamic potential risk area 28 (v1>v2), tracking control is executed (control rule 3) in which a position of the dynamic potential risk area 28 calculated using collected estimation information regarding the potential risk area 28 is set as a goal.

Namely, reliable tracking by the moving body 10 is possible when the dynamic potential risk area 28 is moving in a straight line.

However, in cases in which the movement speed of the moving body 10 is determined to be equivalent to the movement speed of the dynamic potential risk area 28 or slower than the movement speed of the dynamic potential risk area 28 (v1≤v2), tracking control (control rule 4) is performed in which an estimated position to which the potential risk area 28 is likely to move (that it has been estimated the potential risk area 28 will move to) several steps ahead of the position of the dynamic potential risk area 28 as calculated using collected estimation information regarding the potential risk area 28 is set as a goal.

Namely, in cases in which the dynamic potential risk area 28 moves in a straight line, the moving body 10 will gradually be left behind by the dynamic potential risk area 28.

If there were no time lag in tracking movement control, the movement of the moving body 10 would theoretically be able to keep up when tracking if v1=v2. However, in reality, control rule 4 is also applied in the case of v1=v2.

In this manner, in tracking control under control rule 4, a movement path of the moving body 10 deviates from the movement path of the dynamic potential risk area 28. However, in cases in which the estimated position corresponds to an important waypoint, for example, the important role of monitoring can be better secured by prioritizing monitoring at the estimated position even if this involves missing out part of the movement path.

In the potential risk area monitoring control routine illustrated in FIG. 18, the correlative relationship between the movement speeds of the moving body 10 and the potential risk area 28 (classification 1 or classification 2) affects both the input calculation under the control rule 1 executed at step 104 and the input calculation under the control rule 2 executed at step 108.

Accordingly, when executing step 104 or step 108 in FIG. 18, processing (selection control for tracking) is executed to decide a tracking control rule mode (control rule 3 or control rule 4).

Figure 22:
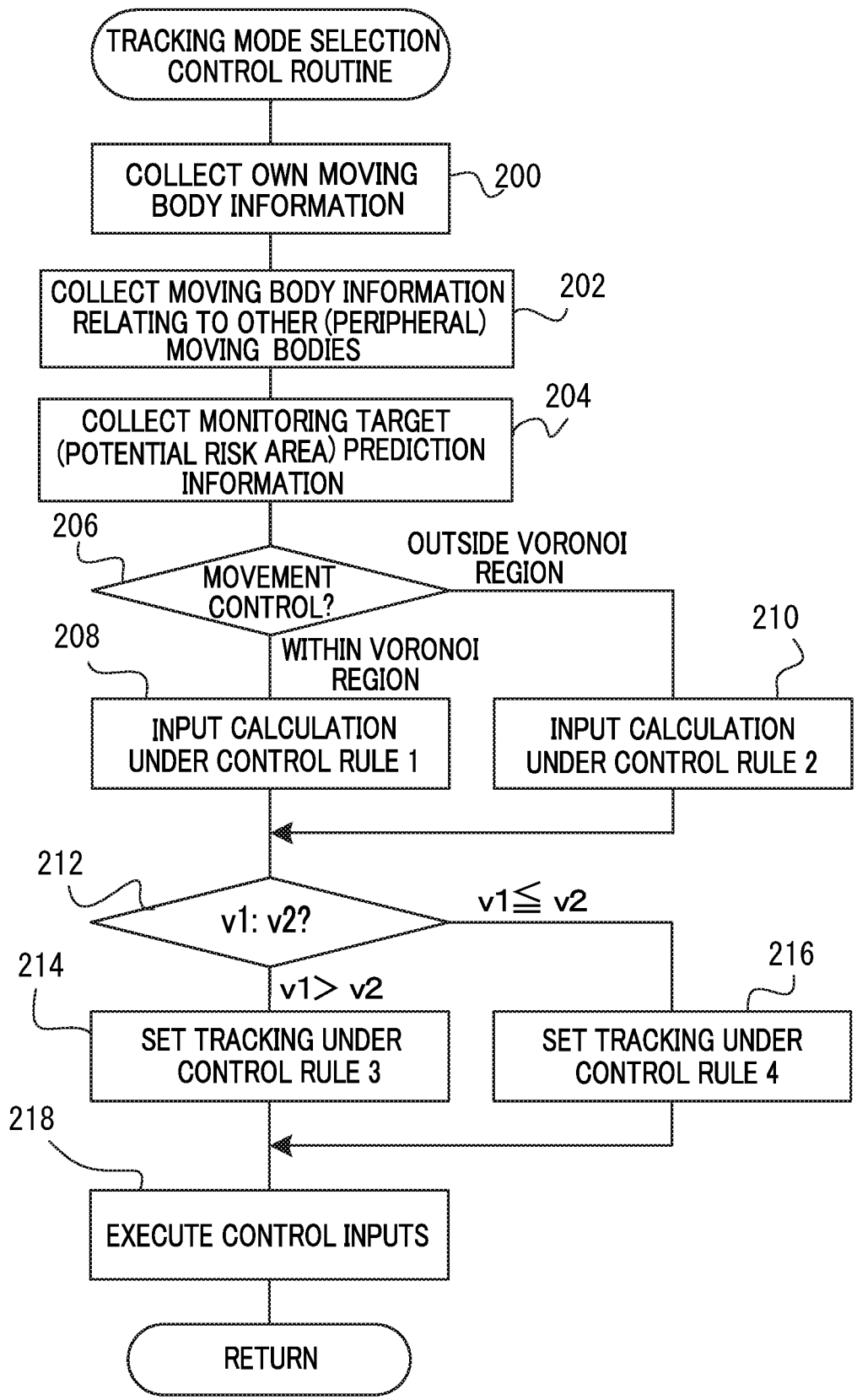
FIG. 22 is a flowchart illustrating a tracking mode selection control routine corresponding to control in an input calculation subroutine under control rule 1 at step 104 in FIG. 18, and an input calculation subroutine under control rule 1 at step 108 in FIG. 18.

FIG. 22 is a flowchart illustrating a tracking mode selection control routine, this being control in a subroutine for the input calculation under control rule 1 at step 104 or a subroutine for the input calculation under control rule 1 at step 108 in FIG. 18.

At step 200 in FIG. 22, information relating to the moving body 10 itself is collected, and then at step 202, information relating to the other moving bodies 10 is collected, and processing transitions to step 204.

At step 204, estimation information relating to the potential risk area 28 is collected. For example, information from a navigation system installed in a vehicle may be acquired in order to ascertain a future travel situation.

At the next step 206, a judgement is made as to whether or not the movement control state in FIG. 18 is within the Voronoi region or outside the Voronoi region.

In cases in which the movement control state is determined to be within the Voronoi region at step 206, a judgement is made in the subroutine illustrated in FIG. 22 that control is being executed under the control rule 1 at step 104 in FIG. 18, and processing transitions to step 208 to perform the input calculation according to the control rule 1. Processing then transitions to step 212.

In cases in which the movement control state is determined to be outside the Voronoi region at step 206, a judgement is made in the subroutine illustrated in FIG. 22 that control is being executed under the control rule 2 at step 108 in FIG. 18, and processing transitions to step 210 to perform the input calculation according to the control rule 2. Processing then transitions to step 212.

At the next step 212, the movement speed v1 (maximum speed) of the moving body 10 itself is compared against the movement speed v2 (maximum speed) of the potential risk area 28 configuring the tracking target to determine which is faster (v1: v2).

In cases in which the movement speed of the moving body 10 is determined to be the same as the movement speed of the potential risk area 28 or faster than the movement speed of the potential risk area 28 at step 212 (v1>v2), processing transitions to step 214, and tracking control (control rule 3) is set such that a position of the potential risk area 28 calculated using the estimation information regarding the potential risk area 28 collected at step 204 is set as a goal. Processing then transitions to step 218.

In cases in which the movement speed of the moving body 10 is determined to be equivalent to the movement speed of the potential risk area 28 or slower than the movement speed of the potential risk area 28 at step 212 (v1≤v2), processing transitions to step 216, and tracking control (control rule 4) is set such that an estimated position to which the potential risk area 28 is likely to move several steps ahead of the position of the dynamic potential risk area 28, as calculated using the estimation information regarding the potential risk area 28 collected at step 204, is set as a goal. Processing then transitions to step 218.

When this is performed, sometimes the moving body 10 will not keep up if the moving body 10 moves in a direction diverging from a line connecting the moving body 10 and the potential risk area 28. However, in cases in which the potential risk area 28 is a vehicle, the moving body 10 can take a shortcut to the estimated position (for example so as to arrive ahead) if for example the vehicle meanders, turns left or right, performs a U-turn, or stops as it moves.

At step 218, the set control inputs are executed, and the subroutine of FIG. 22 is ended (processing returns to step 106 or step 110).

Note that at step 212, the control rule 3 is adopted in cases in which the movement speed v1 (maximum speed) of the moving body 10 is even slightly faster than the movement speed v2 (maximum speed) of the potential risk area 28. Although there is theoretically no problem with this, in practice, from the perspective of "the moving body 10 performing tracking", preferably v1>v2 is satisfied by a given speed difference Δv (=v1−v2) or greater.

Figure 23A:
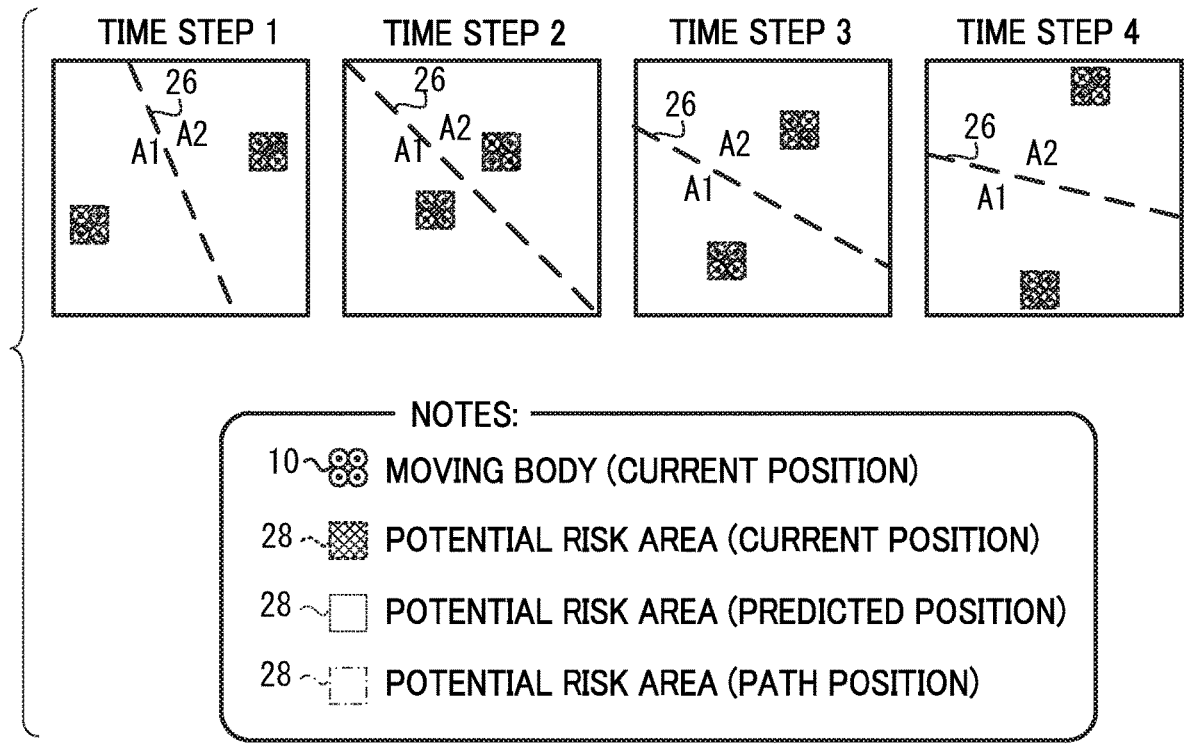
FIG. 23A is a diagram illustrating transition of moving bodies and potential risk areas over a time series based on control rule 3 according to Example 5 of the exemplary embodiment.
Figure 23B:
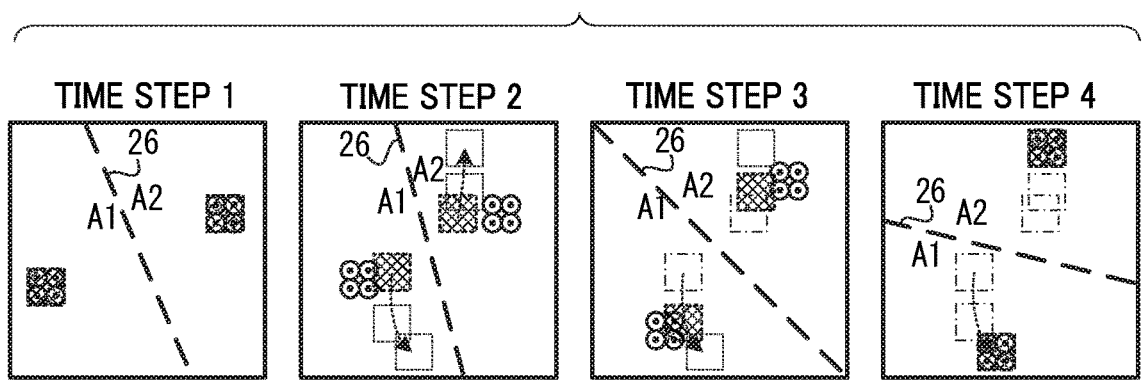
FIG. 23B is a diagram illustrating transition of moving bodies 10 and potential risk areas 28 over a time series based on control rule 4.

Detailed explanation follows regarding Example 5 with reference to FIG. 23A and FIG. 23B.

FIG. 23A illustrates movement of moving bodies 10 and potential risk areas 28 over a time series under the control rule 3 explained in Example 5.

At time step 1, the moving bodies 10 are covering the respective potential risk areas 28 in regions A1, A2 demarcated by the dashed line 26 configuring the Voronoi region boundary.

At time step 2 to time step 4, even though the potential risk areas 28 are moving, since the movement speed of the moving bodies 10 is faster than the movement speed of the potential risk areas 28, the moving bodies 10 are capable of maintaining constant tracking and coverage of the potential risk areas 28.

FIG. 23B illustrates movement of moving bodies 10 and potential risk areas 28 over a time series under the control rule 4 explained in Example 5.

At time step 1, the moving bodies 10 are covering the respective potential risk areas 28 in regions A1, A2 demarcated by the dashed line 26 configuring the Voronoi region boundary.

At time step 2, when the potential risk areas 28 move faster than the moving bodies 10, the moving bodies 10 start moving in an attempt to track the potential risk areas 28. When this is performed, the moving bodies 10 estimate for the time step 3 and the time step 4, and the moving bodies 10 take shortcuts to the positions corresponding to the time step 4 while taking into account the positions of the potential risk areas 28 at time step 3. In this manner, the moving bodies 10 do not lose sight of the positions of the potential risk areas 28.

Figure 24A:
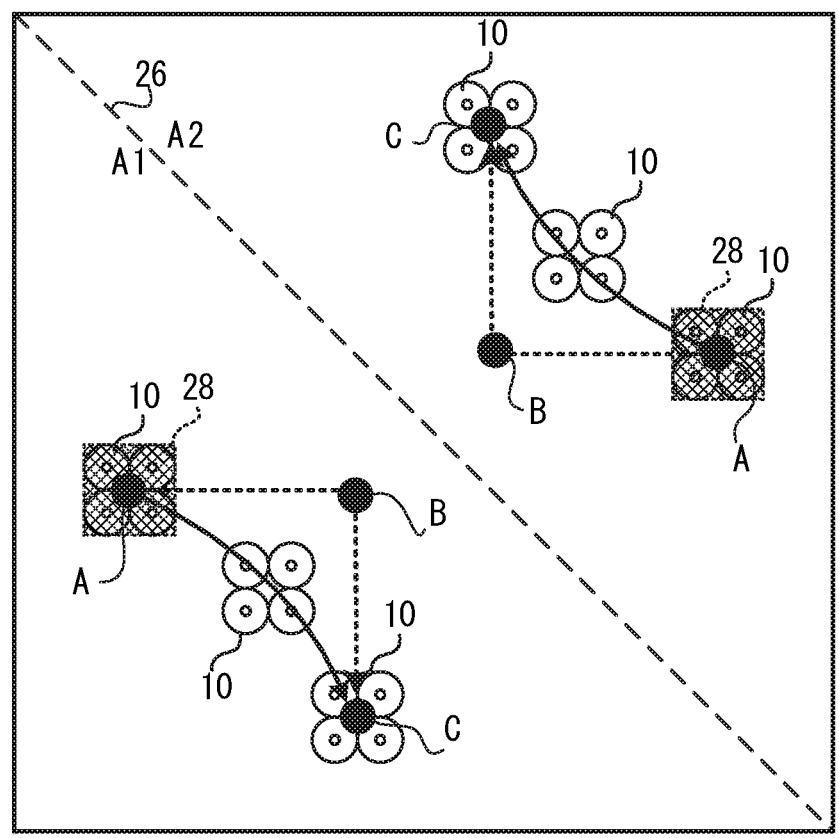
FIG. 24A is a plan view demonstrating the advantageous effects of tracking control based on control rule 4 according to Example 5 by drawing comparison to a comparative example.
Figure 24B:
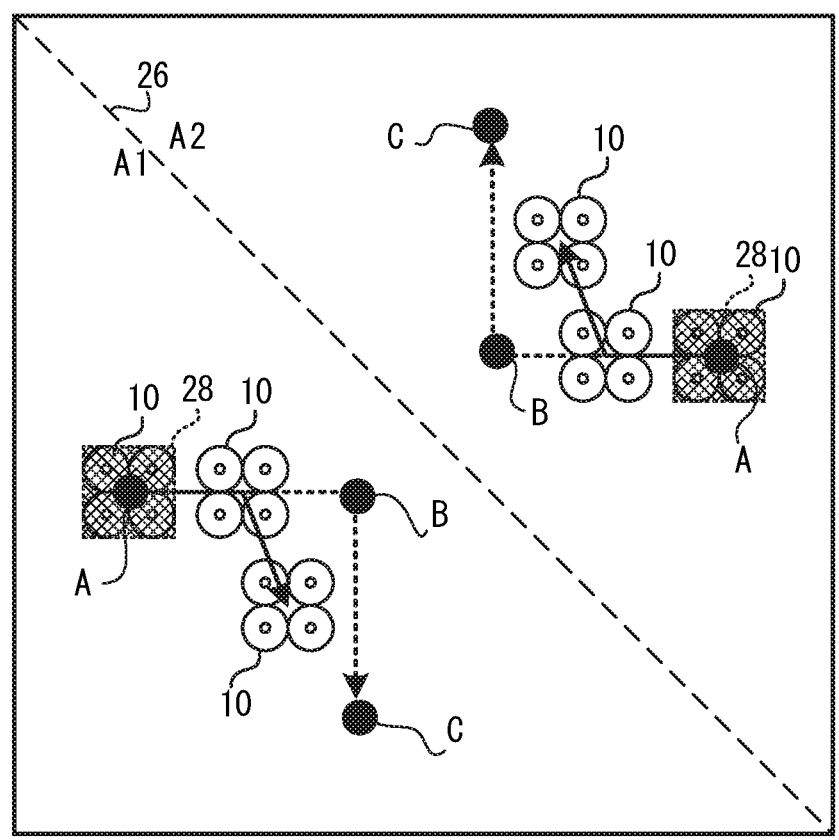
FIG. 24B illustrates a comparative example corresponding to FIG. 24A.

FIG. 24A and FIG. 24B are diagrams to demonstrate the advantageous effects of the tracking control under the control rule 4 of Example 5 by drawing comparison to a comparative example. In FIG. 24A and FIG. 24B, in regions A1, A2 demarcated by the dashed line 26 configuring the Voronoi region boundary, each potential risk area 28 moves in a straight line from a first position A to a second position B and then turns by 90° to move to a third position C.

In a comparative example illustrated in FIG. 24B, since the movement speed of the moving bodies 10 is slower than the movement speed of the potential risk areas 28, when the potential risk areas 28 have started moving from the first positions A, at the same timing as the potential risk areas 28 arrive at the second positions B, the moving bodies 10 are in the process of moving in a straight line between the first position A and the second position B of the corresponding potential risk area 28.

Then, since the potential risk areas 28 move to the third positions C, the moving bodies 10 move toward the potential risk areas 28 from their respective positions between the first position A and the second position B of the corresponding potential risk area 28. However, the potential risk areas 28 arrive at the third positions C while the moving bodies 10 are still on their way, and the moving bodies 10 cannot keep up. In a worst-case scenario, the moving bodies 10 might lose sight of the potential risk areas.

However, in Example 2 illustrated in FIG. 24A, the third position C has been estimated at the point in time when the potential risk areas 28 are moving from the first position A to the second position B. The moving bodies 10 accordingly move in a circular arc toward the third position C, while acknowledging the second position B.

By taking this shortcut, the moving bodies 10 are capable of arriving at the third position C at the point in time when the potential risk areas 28 arrive at the third position. Configuration may also be made such that the moving bodies 10 arrive earlier in time.

Note that the circular arc shaped paths of the moving bodies 10 illustrated in FIG. 24A may be set such that the radii of curvature of the circular arcs are based on a level of importance attached to the second position B. The more important the second position B, the closer the moving bodies 10 will pass to the second position B. In such cases, the arrival at the third position C may be slightly delayed.

As described above, in Example 5 the tracking control mode (control rule 3 or control rule 4) is selected based on the relationship between the movement speed of the moving body 10 and the movement speed of the potential risk area 28 (classification 1 or classification 2). When the moving body 10 would be unable to keep up by moving along the same movement path as the potential risk area 28, the movement of the potential risk area 28 several steps ahead is estimated, and the moving body 10 takes what is referred to as a shortcut (including arriving ahead). As a result, the moving body 10 does not lose sight of the potential risk area 28. The path taken to arrive ahead enables the state of the potential risk area 28 to be reliably monitored en route in consideration of the importance level of the potential risk area 28 when on its movement path.

Note that in each of the exemplary embodiments described above the regions 12 (external environmental regions, regions of responsibility) may equally be set on land, sea, or air.

Applications of this sensing include monitoring, surveying, observation, rescue, and forecasting. More specifically, examples of applications over comparatively small regions include monitoring of vehicles and pedestrians in a parking lot, monitoring of vehicle movements at a crossroad, and monitoring for suspicious activity at a house or the like. Examples of applications over comparatively large regions include excavation surveys, searching for victims at the scene of a disaster (rescue operations), mountain and forest management, and weather surveillance for forecasting.

Although explanation has been given regarding an example in which drones capable of aerial photography are employed as the moving bodies 10 (actuators), the autonomous distributed control may be applied to other moving bodies such as vehicles or boats.

The disclosure of Japanese Patent Application No. 2017-135071, filed on Jul. 10, 2017, is incorporated in its entirety by reference herein.

The invention claimed is:

1. A coverage device comprising:
a sensor that senses external environmental information;
a moving body that has at least a monitoring function in which the moving body moves over a plurality of target regions; and
a processor that is configured to:
define an external environmental region for monitoring a monitoring target, the defined external environmental region is a target region of the plurality of target regions;

determine the target region to be covered based on a prediction result of prediction processing to predict a state quantity, the state quantity including an uncertainty value that decreases as each target region is searched by the monitoring function of the moving body and an importance level that is estimated from the search results of other target regions of the plurality of target regions that have been searched, the determined target region being configured to maintain a predetermined level of simultaneous optimization of (i) a surveillance performance according to the uncertainty of each target region and (ii) a tracking performance according to the importance level of each target region, the predetermined level of simultaneous optimization being maintained by the uncertainty being within an acceptable level by monitoring the target area where the uncertainty exceeds the acceptable level, and, by the tracking performance increasing by continuing the monitoring, when the importance level is high, even when the uncertainty is within the acceptable level; and instruct allotting of actuators so as to provide coverage of the target region determined to be covered.

2. The coverage device of claim 1, wherein:

the surveillance performance of each target region is an Lx-norm of the uncertainty of the target region; and the tracking performance is a product of the importance level of the target region and a coverage ratio of the target region when covered.

3. The coverage device of claim 1, wherein the processor is configured to determine that the target region is a region to be covered in a case in which a determination has been made that the target region is not covered globally.

4. The coverage device of claim 1, wherein the prediction processing includes:

acquiring a transition of the state quantity of the target region as prior knowledge information; and predicting the state quantity of each of the plurality of target regions from a present point to a predetermined future point using a model to predict a change amount in the state quantity of each of the plurality of target regions from the state quantity of a corresponding target region that is defined based on the acquired prior knowledge information and observation history for an actuator from the present point to a predetermined past point.

5. The coverage device of claim 4, wherein the processor is further configured to gather observation history of a plurality of actuators, including the actuator, the observation history of an actuator other than a given actuator of the plurality of actuators are gathered, the actuator being configured to share coverage with the given actuator; and the observation history that is used for determining the model is the gathered observation history.

6. The coverage device of claim 1, wherein respective dedicated actuators address coverage of an unknown target region, which is a target region to be covered in order for the surveillance performance to satisfy the predetermined level, and coverage of a known target region, which is a target region to be covered in order for the tracking performance to satisfy the predetermined level.

7. The coverage device of claim 1, wherein the target region is a blind spot region other than a region that the sensor is configured to sense, and a position and a size of the blind spot region change over time.

8. A moving body that by being disposed in a region of responsibility where the moving body does not interfere with other moving bodies, by including a sensor with a variable monitoring range, and by exchanging position information with other moving bodies, moves so as to change the region of responsibility while avoiding a collision, the moving body comprising:

the sensor; and a processor that is configured to, according to a predetermined prediction processing, move the moving body based on prediction results of the prediction processing predicting a state quantity, the state quantity including an uncertainty value that decreases as each target region is searched by the monitoring function of the moving body and an importance level that is estimated from the search results of other target regions of the plurality of target regions that have been searched, the determined target region being configured to maintain a predetermined level of simultaneous optimization of (i) a surveillance performance according to the uncertainty of each target region and (ii) a tracking performance according to the importance level of each target region, the predetermined level of simultaneous optimization being maintained by the uncertainty being within an acceptable level by monitoring the target area where the uncertainty exceeds the acceptable level, and, by the tracking performance increasing by continuing the monitoring, when the importance level is high, even when the uncertainty is within the acceptable level.

9. A control device in a moving body distributed control system that moves a plurality of moving bodies, the plurality of moving bodies, by respectively being disposed in regions of responsibility not interfering with each other, by respectively including a sensor with a variable monitoring range, and by exchanging position information with each other, moving so as to change the region of responsibility while avoiding collisions, the control device comprising:

a memory; and a processor that is coupled with the memory, the processor being configured to:

according to a prediction processing, designate a monitoring target of a movement destination for a first moving body based on prediction results of the prediction processing predicting a state quantity, the state quantity including an uncertainty value that decreases as each target region is searched by the monitoring function of the moving body and an importance level that is estimated from the search results of other target regions of the plurality of target regions that have been searched, the determined target region being configured to maintain a predetermined level of simultaneous optimization of (i) a surveillance performance according to the uncertainty of each target region and (ii) a tracking performance according to the importance level of each target region, the predetermined level of simultaneous optimization being maintained by the uncertainty being within an acceptable level by monitoring the target area where the uncertainty exceeds the acceptable level, and, by the tracking performance increasing by continuing the monitoring, when the importance level is high, even when the uncertainty is within the acceptable level; and move the first moving body so that a designated monitoring target falls within a monitoring range.

10. The control device of claim 9, wherein the processor is further configured to:

determine, in a case in which the surveillance performance relating to the uncertainty of each of the monitoring targets within the region of responsibility of the first moving body and the tracking performance relating to the importance level of each of the monitoring targets within the region of responsibility of the first moving body satisfy the respective predetermined levels, to move the first moving body to a region of responsibility of a second moving body for which the surveillance performance relating to the uncertainty of each of the monitoring targets within the region of responsibility and the tracking performance relating to the importance level of each of the monitoring targets within the region of responsibility do not satisfy the respective predetermined levels, wherein the first moving body is made to move to the region of responsibility of the second moving body where the determination section has determined to move the first moving body.

11. The control device of claim 10, wherein
the processor is further configured to:
after the first moving body has been moved by being controlled, transmit information indicating a monitoring level of a monitoring target within the region of responsibility of the first moving body, and receive information indicating the monitoring level of the monitoring target within the region of responsibility of the second moving body;
judge, based on the received information, whether or not a condition for moving toward a monitoring target in the region of responsibility of the second moving body, which is outside of the current region of responsibility of the first moving body, has been met; and
mediate, in order to finalize a moving body to move among a plurality of moving bodies including the first moving body, that has been judged that the condition to move has been met.

12. The control device of claim 11, wherein the processor is configured to judge based on whether or not a collision with another moving body would occur on a movement path to an objective monitoring target.

13. The control device of claim 11, wherein the processor is configured to mediate based on at least one of a time until the condition is met, a time required for movement, or demanded sensor functionality.

14. The control device of claim 10, wherein the prediction processing includes:
acquiring a transition of the state quantity of the monitoring target as prior knowledge information; and
predicting that predicts the state quantity of each of the monitoring targets from a present point to a predetermined future point using a model to predict a change amount in the state quantity of each of the monitoring targets from the state quantity of each of the monitoring targets, the model being determined based on the acquired prior knowledge information and observation history information for the moving body from the present point to a predetermined point in the past.

15. The control device of claim 14, wherein
the processor is further configured to gather observation history information of the plurality of moving bodies, observation history information of a moving body other than a given moving body is gathered, the other moving body being capable of sharing monitoring with the given moving body; and the observation history information that is used for determining the model is the gathered observation history information.

16. The control device of claim 10, wherein respective dedicated moving bodies independently address monitoring of an unknown monitoring target that is a monitoring target requiring monitoring in order for the surveillance performance to satisfy the predetermined level, and monitoring of a known monitoring target that is a monitoring target requiring monitoring in order for the tracking performance to satisfy the predetermined level.

17. The control device of claim 10, wherein:
each surveillance performance is an Lx-norm of the uncertainty of a monitoring target; and
each tracking performance is the product of the importance level of the monitoring target and a coverage ratio when monitoring a monitoring target.

18. The control device of claim 10, wherein the processor is further configured to:
acquire movement speed information and movement plan information relating to the monitoring target;
determine a speed difference between the movement speed of the monitoring target and a movement speed of the moving body based on the acquired movement speed information;
based on the acquired movement plan information, identify an estimated position of the monitoring target after a predetermined time that is estimated from a current position of the monitoring target, and an estimated movement route along which movement of the monitoring target is estimated to the estimated position after the predetermined time in a case in which the movement speed of the monitoring target is determined to be faster than the movement speed of the moving body according to a determination result; and
control such that the moving body moves toward the estimated position after the identified predetermined time and the moving body also moves along the estimated movement route.

19. The control device of claim 18, wherein the processor is configured to identify an estimated position selected from a plurality of important waypoints that are present on a predetermined movement route of the monitoring target and that are prioritized for monitoring.

20. The control device of claim 18, the processor is configured to calculate a remaining time for the moving body to arrive at the estimated position earlier than the monitoring target in a case in which the moving body is moved to the estimated position along a shortest route and continues to track movement of the monitoring target so as to minimize both the calculated remaining time and a distance to the monitoring target.

21. The control device of claim 18, wherein the processor is configured to control such that the moving body moves along the movement route, the movement route being the estimated movement route and being a circular arc shape connecting a current position of the moving body to the estimated position after the identified predetermined time.

22. A non-transitory recording medium that stores a distributed control program executable by a computer to perform distributed control processing of a moving body distributed control system in which, by disposing a plurality of moving bodies in regions of responsibility not interfering with each other, by respectively including a sensor with a variable monitoring range in each of the plurality of moving bodies, and by exchanging position information and observations among the plurality of moving bodies, the plurality of moving bodies change the region of responsibility while avoiding collisions, the distributed control processing comprising:

by a predetermined prediction processing, designating a monitoring target of a movement destination for a moving body, based on prediction results of the prediction processing predicting a state quantity, the state quantity including an uncertainty value that decreases as each target region is searched by the monitoring function of the moving body and an importance level that is estimated from the search results of other target regions of the plurality of target regions that have been searched, the determined target region being configured to maintain a predetermined level of simultaneous optimization of (i) a surveillance performance according to the uncertainty of each target region and (ii) a tracking performance according to the importance level of each target region, the predetermined level of simultaneous optimization being maintained by the uncertainty being within an acceptable level by monitoring the target area where the uncertainty exceeds the acceptable level, and, by the tracking performance increasing by continuing the monitoring, when the importance level is high, even when the uncertainty is within the acceptable level; and moving the moving body so that the designated monitoring target falls within a monitoring range.

\* \* \* \* \*